United States Patent [19]

Kataoka et al.

[11] Patent Number: 4,501,481
[45] Date of Patent: Feb. 26, 1985

[54] FLASH PHOTOGRAPHING SYSTEM

[75] Inventors: Hiroyuki Kataoka, Saitama; Masanori Yamada; Nobuyuki Suzuki, both of Kanagawa, all of Japan

[73] Assignee: Canon Kabushiki Kaisha, Tokyo, Japan

[21] Appl. No.: 444,214

[22] Filed: Nov. 24, 1982

[30] Foreign Application Priority Data

Dec. 4, 1981 [JP] Japan ................................ 56-196031
Dec. 21, 1981 [JP] Japan ................................ 56-207685
Jan. 9, 1982 [JP] Japan ................................ 57-1904

[51] Int. Cl.³ ........................ G03B 7/16; G03B 15/02; G03B 15/03
[52] U.S. Cl. .................................. 354/413; 354/415; 354/418
[58] Field of Search ................ 354/415, 418, 419, 413

[56] References Cited

U.S. PATENT DOCUMENTS 4,327,978 5/1982 Ishida et al. .......................... 354/415

Primary Examiner—L. T. Hix
Assistant Examiner—Douglas S. Lee
Attorney, Agent, or Firm—Toren, McGeady and Stanger

[57] ABSTRACT

A flash device for a photographic camera either inhibits a flashing action or shifts the control mode of the camera from flash photography to daylight photography in cases where the object to be photographed is located outside of an adequately operable distance range. A pre-flashing action detects a distance to the object when a main capacitor is charged to a given level before the capacitor is fully charged for flash photography. Then flash photography is performed at an aperture value determined on the basis of the detected distance when the distance is within the adequately operable distance range. When the detected distance is outside of the adequately operable distance range, the main capacitor is further charged for an increased flashing power. Then the distance to the object is again detected by a second preflashing action before flash photography is carried out at an aperture value determined on the basis of the distance detected by the second pre-flashing action. The flash photography arrangement thus permits seizing a shutter chance for flash photographing an object located at a relatively short distance without waiting until the main capacitor is fully charged.

22 Claims, 17 Drawing Figures

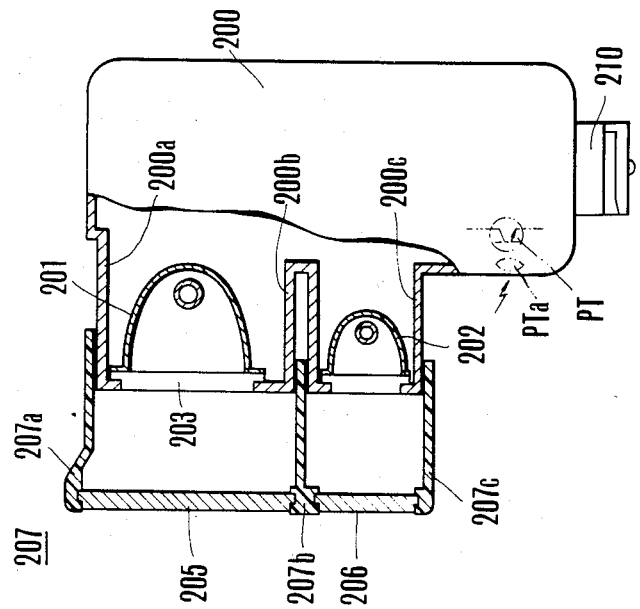
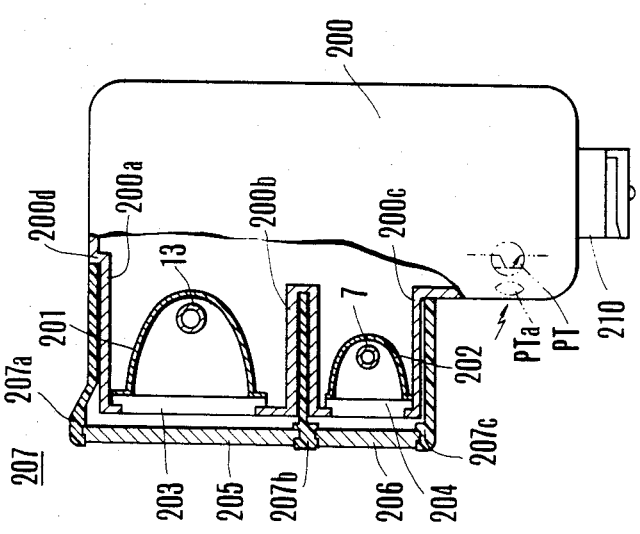

FLASH PHOTOGRAPHING SYSTEM

BACKGROUND OF THE INVENTION

1. Field of the Invention

This invention relates to a flash photography system and more particularly to a flash photography system of the type which determines a diaphragm aperture value corresponding to the distance to the object to be photographed by pre-flashing a light before a main flashing action is performed at the determined aperture value.

2. Description of the Prior Art

Photographic flash devices have been known of the type in which a pre-flashing action is performed to detect an object distance and to determine a diaphragm aperture value according to the detected distance before flash photography is carried out at the determined aperture value. In flash devices of this type, the aperture value is determined according to the distance to the object and flash photography is carried out at the aperture value so that the flash photography is always adequate. However, in photographing with a flash device of this type, if the object is located at a distance greater than that which can be covered by the light emitting capacity of the flash device, it is hardly possible to obtain an adequate exposure even if the aperture value is predetermined by the pre-flashing action.

When the aperture value determined by pre-flashing is smaller than the full-open F-number of the lens in use, the diaphragm cannot be set at the aperture value determined by pre-flashing (a designated aperture value). Then, it is impossible to have proper exposure.

Furthermore, when the object to be photographed is located at a very short distance from the camera, flash photography results in overexposure even if it is carried out at an aperture value determined in accordance with the distance determined by pre-flashing.

The flash device of the above type has thus been incapable of ensuring proper exposure where the object to be photographed is located beyond a range of distances detectable by pre-flashing and where the object is located at a very short distance. It is, therefore, desirable for a flash device of this type to ensure a proper exposure even for an object located at a great distance. This is possible by having the flash device perform the pre-flashing action for determining an aperture value after the main capacitor thereof has been amply charged to impart a sufficient flashing power to the flash device. This arrangement, however, necessitates inhibiting flash photography until the main capacitor has been sufficiently charged. Then, with the flash device arranged in this manner, the photographer tends to miss photographing opportunities. Meanwhile, if an object is located at a relatively short distance, the main capacitor does not have to be fully charged to obtain a proper exposure. In spite of this, inhibition of flash photography until the main capacitor is sufficiently charged for an object located at a greater distance deprives the photographer of an opportunity for photographing a closer object.

It is an object of the present invention to provide a flash photography system for a photographic camera which obliterates the above stated shortcomings of the prior art either by inhibiting a flashing action or by shifting the control mode of the camera to a daylight photography mode when an object to be photographed is located beyond an adequately operable distance.

It is another object of the invention to provide a flash photography system which obliterates the above shortcomings of the prior art arrangement either by inhibiting a flashing action or by shifting the control mode of the camera from flash photography to daylight photography when the object to be photographed is located at an extremely short distance.

It is a further object of the invention to provide a flash photography system for a camera which either inhibits a flashing action or shifts the control mode of the camera from a flash photography mode to a daylight photography mode when an aperture value is determined by the distance to an object to be photographed and is smaller than the full-open F-number of the lens of the camera.

It is still a further object of the invention to provide a flash photography system for a camera wherein the distance to an object is detected by pre-flashing, etc., when a main capacitor is charged to a given level before the capacitor is fully charged; then when the distance is within an adequately operable range, flash photography is performed at a diaphragm aperture value which is determined on the basis of the detected distance; or the main capacitor is further charged for an increased flashing power when the distance detected is outside of the adequately operable range. Then, in the latter case, the distance to the object is again detected by a second pre-flashing action and flash photography is carried out at an aperture value determined on the basis of the distance detected by the second pre-flashing action, so that flash photography can be carried out at a desired shutter chance for an object located at a relatively short distance in a shorter charging time, without waiting until the main capacitor is fully charged for objects located at greater distances.

These and further objects and features of the invention will become apparent from the following detailed description of preferred embodiments thereof taken in conjunction with the accompanying drawings.

SUMMARY OF THE INVENTION

It has been found that these and other objects of the invention may be attained in a flash device which includes a distance detection circuit for detecting a distance to an object to be photographed together with an aperture determining circuit arranged to determine an aperture value for flash photographing according to the distance detected by the distance detection circuit. The apparatus also includes an output signal forming circuit arranged to produce an output when the distance detected by the distance detection circuit is farther than a predetermined distance and a flashing circuit including a flash discharge tube arranged to cause the flash discharge tube to flash at the time of flash photographing. The flashing circuit is arranged to become operative in response to the output of the output signal forming circuit.

BRIEF DESCRIPTION OF THE DRAWINGS

In the drawings:

FIGS. 10(a) and (b) are elevational views in partial section showing the outside appearances and the structural arrangement of the flash devices of FIGS. 1, 5 and 7;

DETAILED DESCRIPTION OF THE PREFERRED EMBODIMENTS

Figure 1:
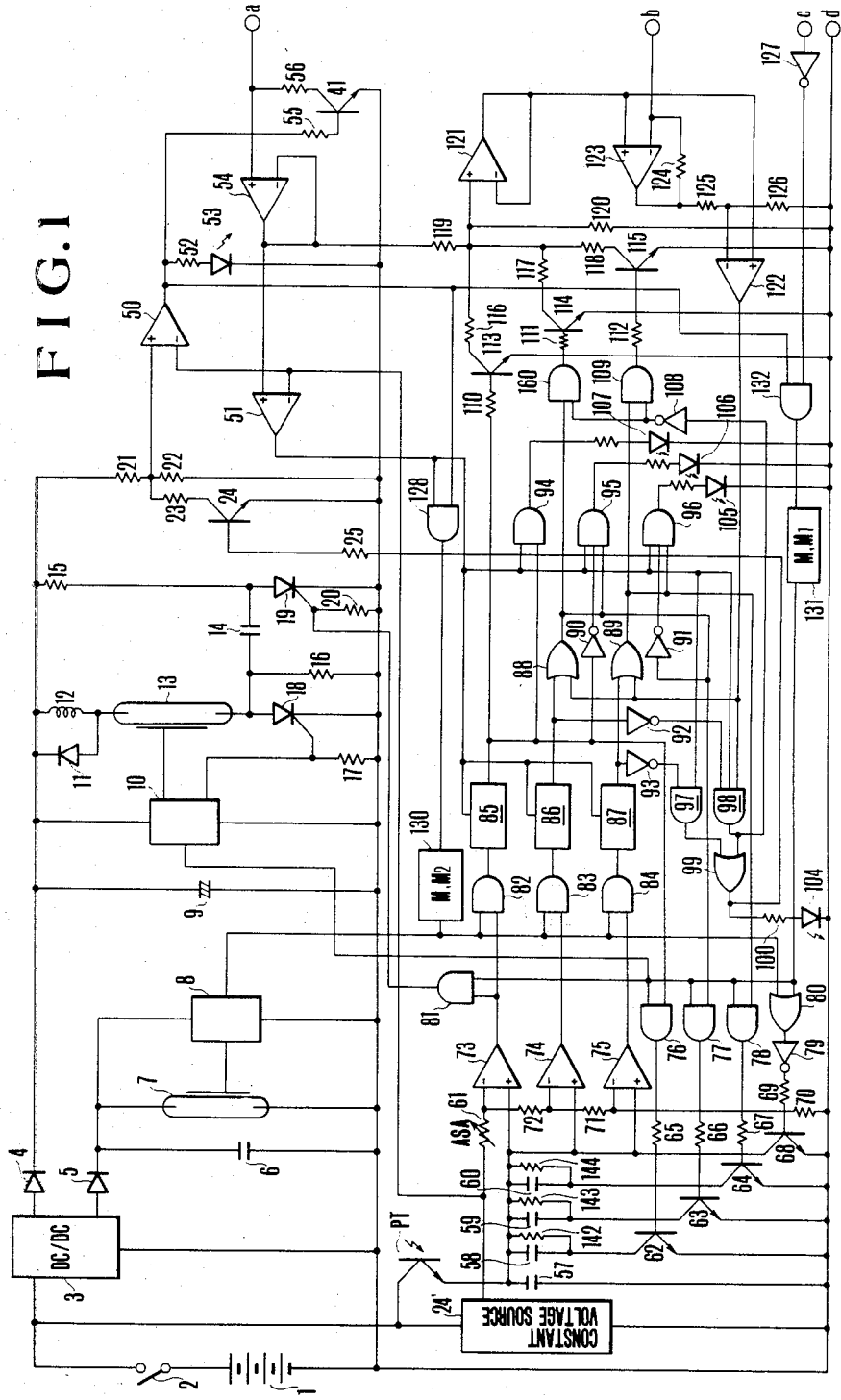
FIG. 1 is a circuit diagram showing a flash device in accordance with one embodiment of the present invention.

An embodiment of the flash photography system according to the present invention includes a flash device, as shown in the FIG. 1 circuit diagram. The flash device includes a battery 1; a power source switch 2 which is connected in series with the battery 1; a DC-to-DC converter 3 which boosts the low voltage of the battery 1; diodes 4 and 5 rectify the output of the DC-to-DC converter 3; an auxiliary capacitor 6 which causes a distance measuring auxiliary discharge tube 7 to emit a light; and a trigger circuit 8 which triggers the auxiliary discharge tube 7. The capacitor 6, the discharge tube 7 and the trigger circuit 8 constitute a distance measurement light emitting circuit. In the flash device, there are further included a main capacitor 9 which causes a flash photographing main discharge tube 13 to emit a flash light; a trigger circuit 10 which triggers the main discharge tube 13 and a main thyristor 18; a diode 11 connected in parallel to an inductor 12 which is series connected to the main discharge tube 13; resistors 15 and 16 provided for charging a commutation capacitor 14; a resistor 17 connected between the gate and the cathode of the main thyristor 18; and a resistor 20 connected between the gate and the cathode of an auxiliary thyristor 19. These circuit elements jointly constitute a control circuit which controls emission of flash light and termination of the flashing action. A comparator 50, which detects a voltage obtained through bleeder resistors 21 and 22, detects the voltage of the main capacitor 9. The comparator 50 produces a charge completion signal when the charge level of the main capacitor 9 reaches a predetermined potential. A transistor 24 has the base thereof connected through a resistor 25 to the output terminal of an OR gate 99 and the collector thereof is connected through a resistor 23 to a connection point between the resistors 21 and 22. The transistor 24 forms a charge completion level setting circuit by connecting the resistor 23 in parallel to the resistor 22 for increasing the level of charge completion detection by the comparator 50. The charge completion detection level set by the resistors 21 and 22 corresponds to a charge level I of the main capacitor 9 necessary for obtaining a quantity of flash light required for obtaining proper exposure for an object located at a relatively short distance d0–d3. Meanwhile, when the object to be photographed is located at a distance farther than the distance d3, the charge completion detection level, which is obtained with the resistor 23 connected in parallel with the resistor 22, is at a value corresponding to a charge level II of the main capacitor 9 which is necessary in obtaining a flash light quantity for obtaining proper exposure for the object located at such a great distance. The output of the comparator 50 is obtained when the main capacitor 9 is charged to a level I which ensures proper exposure for an object located within a distance range from d0 to d3. The charge completion signal of the comparator 50, which is obtained when the main capacitor 9 is charged to another level II, ensures proper exposure for an object located at a distance exceeding the distance d3. The flash device further includes a terminal a which receives a constant voltage $V_{CT}$ supplied from the camera side in response to the first stroke of a release device on the camera; a buffer amplifier 54 (hereinafter called the buffer 54) produces a voltage received from the terminal a as it is; and a comparator 51, which detects the presence or absence of an output voltage of the buffer 54, produces a high level (hereinafter called HL for short) output as a first stroke signal in response to the output voltage of the buffer 54. The comparator 51 and the buffer 54 thus form a first stroke signal forming circuit. A resistor 52 is series connected to a light emitting diode 53, which forms a charge completion display circuit indicating completion of a charging process by emitting a light according to the output of the comparator 50. A resistor 56 is connected to the terminal a and the collector of a transistor 41. Another resistor 55 is connected to the output terminal of the comparator 50 and the base of the transistor 41. This transistor 41 forms a mode change-over signal forming circuit which, in response to the charge completion signal from the comparator 50, supplies a mode change-over current to the terminal a by impressing on the resistor 56 the constant voltage impressed on the terminal a. There is provided a phototransistor PT which serves as a light sensitive element for distance measurement and light adjustment. For example, the transistor PT is disposed in front of the casing of the flash device to receive a light reflection resulting from flashing. A reference numeral 24' indicates a known constant voltage circuit. The constant voltage circuit 24' produces a reference voltage which is supplied to the comparators 50 and 51. The output of the constant voltage circuit 24' further gives a reference voltage to comparators 73, 74 and 75 after bleeding through a film sensitivity input volume control 61 and resistors 72, 71 and 70. Integration capacitors 57, 58, 59 and 60 integrate the photo-current of the photo-transistor 23. The capacitors 58, 59 and 60 respectively have high resistors 142, 143 and 144 connected thereto for discharge. An integration circuit for distance measurement and light adjustment is formed by the photo-transistor 23 and the capacitors 58, 59 and 60. The voltage of the integration capacitor 57 is AD converted through the comparators 73, 74 and 75. The output terminals of the comparators 73, 74 and 75 are respectively connected to AND gates 82, 83 and 84. One of the input terminals of each of the AND gates 82, 83 and 84 is connected to the output terminal of a monostable multivibrator (hereinafter called the one-shot) 130, the input terminal of the trigger circuit 8 or the input terminal of an OR gate 80. The one-shot 130 forms a distance measurement signal forming circuit, which produces a distance measurement action signal. This signal actuates the trigger circuit 8 to trigger the distance measuring auxiliary discharge tube 7; turns on the AND gates 82, 83 and 84; and transmits the output of the comparators 73, 74 and 75 respectively to storage circuits 85, 86 and 87 (hereinafter called latch circuits). The above stated comparator 51 serves as a latch signal forming circuit which produces a latch signal for controlling the actions of the latch circuits 85, 86 and 87. The latch circuits 85, 86 and 87 produce an HL signal in response to an HL signal supplied thereto within a period of time during which an HL output is produced from the comparator 51. The HL signal is maintained until the output of the comparator 51 becomes a low level (hereinafter called LL). The flash device is further provided with AND gates 76, 77 and 78. The output termianls of these AND gates 76, 77 and 78 are connected to the bases of transistors 62, 63 and 64 through resistors 65, 66 and 67. The collectors of the transistors 62, 63 and 64 are respectively connected to the capacitor 58, 59 and 60. The transistors 62, 63 and 64 and the AND gates 76, 77 and 78 jointly for an integration capacitor selection circuit for selection of the capacitors 58, 59 and 60. A terminal c is a synchronization terminal to be connected to the synchronizing switch of the camera. An AND gate 132 has one of the input terminals connected to an inverter 127 and the other input terminal to the output terminal of the above comparator 50. The output terminal of the AND gate 132 is connected to the input terminal of a one-shot circuit 132. The one-shot circuit 131 is arranged to produce a one-shot pulse as a flash start signal in response to the output of the AND gate 132 and has the output terminal thereof connected to the above stated AND gates 76, 77 and 78. The one-shot circuit 131, the AND gate 132 and the inverter 127 form a flash start signal circuit for actuating the above selection circuit as well as for causing a flashing action to take place. Numeral 80 indicated an OR gate; 79 indicates an inverter; and 69 indicates a resistor. Through this resistor 69, a transistor 68 has its base connected to the inverter 79. Meanwhile, a part of the transistor 68 between the emitter and collector thereof is connected in parallel to the integration capacitors 57, 58, 59 and 60. The transistor 68, the inverter 79 and the OR gate 80 form an actuation control circuit which actuates the above integration circuit only during a flashing action. AND gates 94, 95 and 96 respectively have light emitting diodes 105, 106 and 107 connected to their output terminals. The AND gates 94, 95 and 96 and the light emitting diodes 105, 106 and 107 form a display circuit which indicates a designated aperture value for flash photography and/or a distance to an object to be photographed. In this display circuit, the light emitting diode 107 indicates that the distance to the object is short and the designated aperture value represents a small aperture $F_0$. The light emitting diode 106 indicates that the distance to the object is medium and that the designated aperture value represents an aperture $F_1$ which is closer than the aperture $F_o$ to a maximum or full-open aperture. The light emitting diode 105 indicates that the object distance is long and that the designated aperture value represents an aperture $F_2$, which is closer than the aperture $F_1$ to the maximum aperture. A buffer amplifier 121 has a non-inversion input terminal thereof connected to the connection point of bleeder resistors 119 and 120, which are for the output of the buffer 54, mentioned in the foregoing. The buffer amplifier 121 (hereinafter called the buffer 121) has the input voltage of the non-inversion input terminal thereof produced when it is through the output terminal thereof. An operational amplifier 123 has the non-inversion input terminal connected to the output terminal of the buffer 121 and has a resistor 124 connected between the output terminal and the inversion input terminal thereof. The voltage of the non-inversion input terminal is produced as it goes to the inversion input terminal of the output amplifier 123. Aperture information resistors 116, 117 and 118 are connected to the non-inversion input terminal of the buffer 121. Meanwhile, transistors 113, 114 and 115 have these resistors 116, 117 and 118 respectively connected to the collectors thereof. The buffer 121, the operational amplifier 123, the resistors 119, 120, 116, 117 and 118 and the transistors 113, 114 and 115 constitute an aperture information forming circuit which produces an aperture information voltage for flash photography which is transmitted through a terminal b to the aperture control circuit of the camera. The resistance values of the resistors 116, 117 and 118 of this circuit are set in the following manner. The potential of the non-inversion input terminal of the buffer 121, i.e., the aperture information voltage to be supplied to the terminal b becomes a voltage $V_0$ representing the aperture value $F_0$ when all of these resistors 116, 117 and 118 are connected in parallel relative to the resistor 120; becomes a voltage $V_1$ representing the aperture value $F_1$ when the resistors 117 and 118 are connected in parallel relative to the resistor 120; and becomes a voltage $V_2$ representing the aperture value $F_2$ when only the resistor 118 is connected in parallel relative to the resistor 120. The resistance values of the resistors 119 and 120 are set in such a manner that the aperture information voltage becomes a voltage $V_3$ representing an F-number $F_3$ which is smaller than a full-open aperture value of a lens normally in use (such as F1.0).

Numerals 160, 109 and 98 indicate AND gates; 90, 91, 92 and 93 indicate inverters; and 88 and 89 indicate OR gates. These logic elements form a control circuit which drives and controls the selection circuit for the integration circuit, the aperture display circuit and the aperture information forming circuit on the basis of the contents of the latch circuits 85, 86 and 87.

Bleeder resistors 125 and 126 are connected to the output terminal of the amplifier 123. A comparator 122 has one of the input terminals thereof connected to the connection point of the bleeder resistors 125, 126 and the other input terminal thereof connected to the output terminal of the buffer 121. The comparator 122, the bleeder resistors 125, 126 and the amplifier 123 jointly form a detection circuit which detects information on the full-open F-number of the lens disposed on the camera side. The terminal b is connected to a full-open F-number information source disposed on the camera side and the above stated detection circuit detects the full-open F-number of the lens by detecting the value of the impedance Z of the full-open F-number information source. The comparator 122 produces an LL output when the full-open F-number of the lens is of a smaller value than the designated aperture value $F_2$, that is, when the lens is brighter than the aperture value $F_2$, and produces the HL output when the lens in use is darker than the designated aperture value $F_2$.

A reference numeral 104 identifies a light emitting diode which gives a warning when the distance to the object to be photographed is outside of an adequately operable distance range; and a symbol d indicates a grounding terminal.

Figure 2:
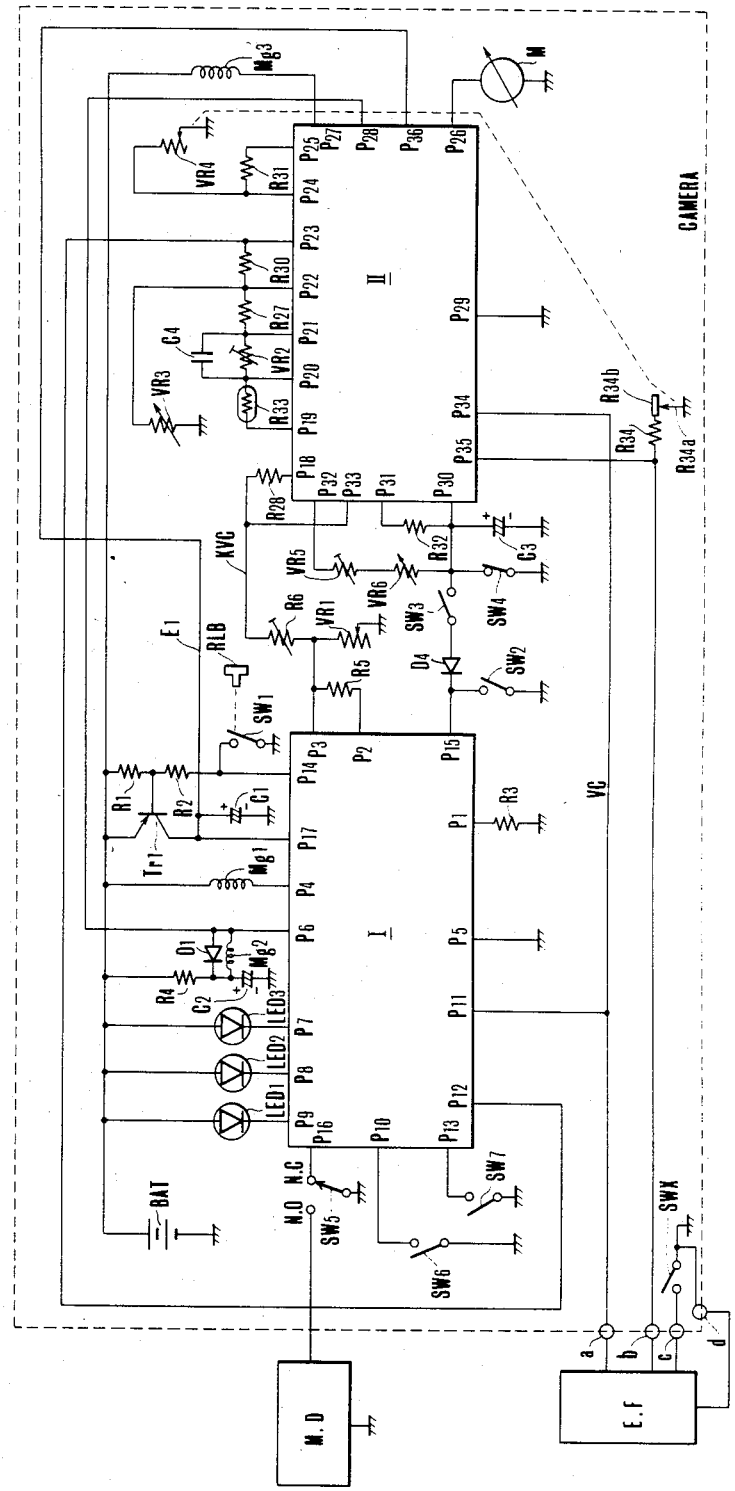
FIG. 2 is a circuit diagram of a camera with the flash device of FIG. 1 mounted thereon.

The FIG. 2 electric circuit diagram shows a camera used in combination with the flash device of FIG. 1. The parts to be contained within the camera body are encompassed with a broken line. In FIG. 2, a block MD represents a motor drive device and another block EF represents the flash device which has been described in the foregoing with reference to FIG. 1. The terminals a, b, c and d are identical with the terminals a, b, c and d shown in FIG. 1. A block I identifies an integrated circuit (LSI) which forms a sequence control part and an automatic exposure control part. The integrated circuit I is provided with input and output terminals and external discrete component connection terminals P1–P17. Another integrated circuit II (LSI) forms a light measuring part, a computing part and a shutter time control part. The integrated circuit II is provided with input and output terminals and external discrete component connection terminals P18–P36. The camera includes an information display meter M; electromagnets Mg1, Mg2 and Mg3; a transistor Tr1 which forms a power supply holding circuit for holding a power supply from a power source battery BAT; display light emitting diodes LED1–LED3; switches SW1–SW7; and variable resistors VR1–VR7 provided for the purposes of setting information, etc.

Referring again to FIG. 2, the camera is provided with a shutter release operation button RLB; the switch SW1 which turns on when the release button RLB is depressed by a first stroke; the switch SW2 which turns on when the release operation button RLB is depressed a second stroke for shutter release action; the switch SW3 which turns on during a bulb exposure; the count switch SW4 which turns off when the shutter is opened; and the change-over switch SW6 for change-over between automatic and manual photography. The switch SW6 turns on during manual photography. The camera further includes the switch SW7 which is for self-timer photography and which turns on when a self-timer is used; the switch SW5 which is for switch-over between film winding action and a photographing action of the camera when photography is performed with the motor drive device MD and shifts to one side N.C. upon completion of the film winding action and to the other side N.O. upon travel completion of a trailing shutter curtain; a switch SWX triggers the flash device for flashing by turning on upon travel completion of a leading shutter curtain; the magnet Mg1 for automatic exposure control; the magnet Mg2 for starting a camera action; and another magnet Mg3 for shutter time control.

In the camera shown in FIG. 2, the circuit element II performs light measurement, computation and shutter time control in an analytical manner. The circuit element I digitally performs aperture control for automatic exposure and sequential control in various photography modes. The details of these actions have already been seen in U.S. Pat. No. 4,265,521. Therefore, these actions will be described hereinafter together with the detailed description of the integrated circuit II, which relates to the present invention.

Figure 3:
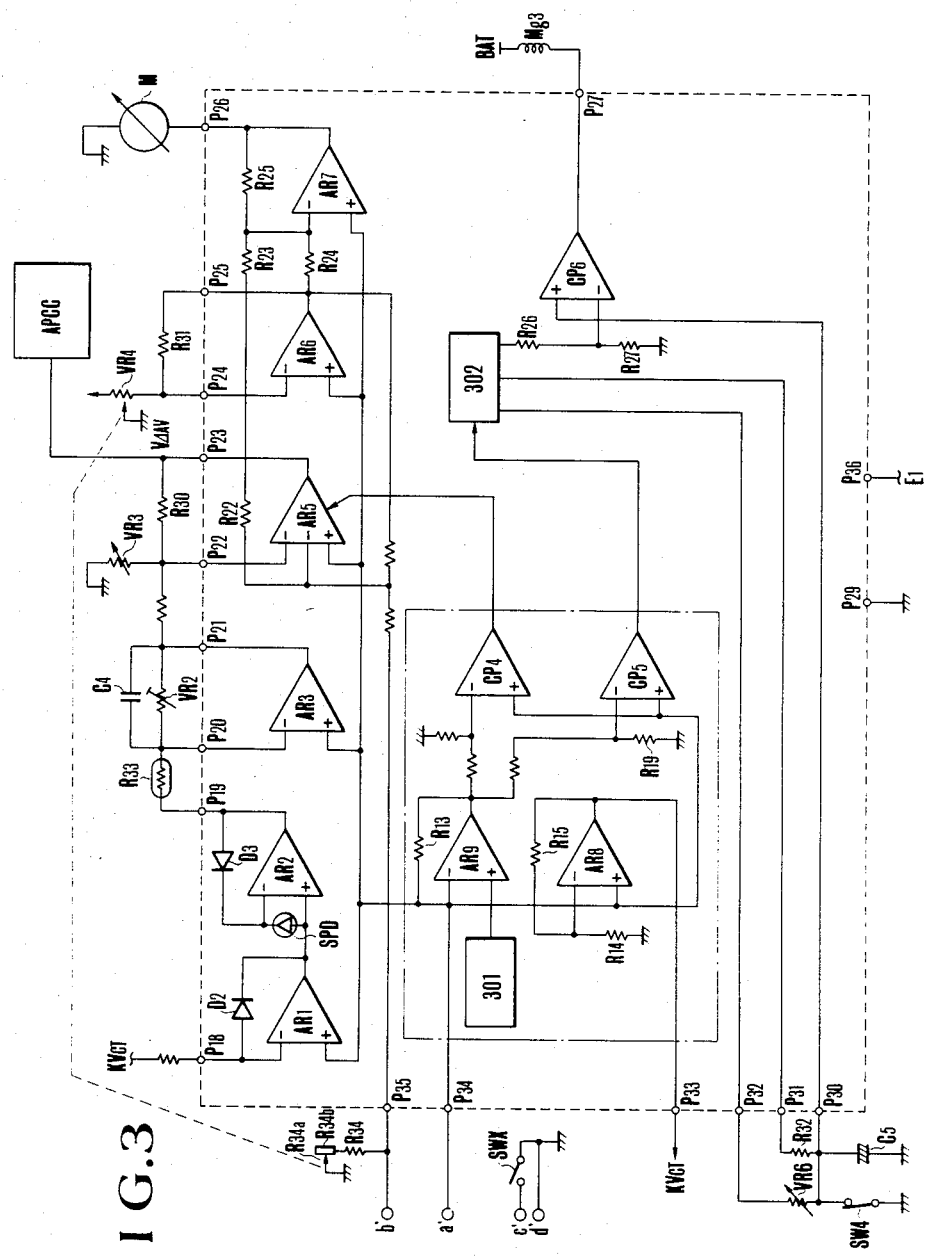
FIG. 3 is a circuit diagram showing the details of the control circuit II of FIG. 2.

FIG. 3 shows the details of the electric circuit II of the camera of FIG. 2 in an embodiment of the present invention. Referring to FIG. 3, the circuit is provided with connection terminals a', b', c' and d' which are connected respectively to the terminals a, b, c and d of the flash device shown in FIG. 1. A constant voltage source 301 produces the constant voltage $V_{CT}$ which has been mentioned in the foregoing. The output terminal of this constant voltage source 301 is connected to the non-inversion input terminal of an operational amplifier AR9. The operational amplifier AR9 has a feedback resistor R13 connected between the inversion input terminal and the output terminal thereof. The inversion input terminal of the operational amplifier AR9 is connected to the terminal a'. The potential of the non-inversion input terminal and that of the inversion terminal of the operational amplifier AR9 are equal. Such being the arrangement, the constant voltage $V_{CT}$ is produced at the terminal a'. There are provided comparators CP4 and CP5, each of which has its negative input terminal connected to the output terminal of the amplifier AR9 through the resistor R13 and its positive input terminal connected to the inversion input terminal of the same amplifier AR9. These comparators CP4 and CP5 form a photographing mode change-over circuit in conjunction with a shutter time change-over circuit 302. A variable resistor VR6 gives a resistance value corresponding to a preset shutter time in response to a shutter dial. A fixed resistor R32 serves as a shutter time information source for flash photography. In conjunction with these resistors VR6 and R32, a capacitor C5 forms a time constant circuit. The count switch SW4 turns off in response to the travel of the leading shutter curtain. A comparator CP6 has its negative input terminal arranged to receive a reference voltage through resistors R26 and R27 and its positive input terminal connected to the output terminal of the time constant circuit. The magnet Mg3 holds the trailing shutter curtain. A shutter time control circuit is formed by these circuit elements. The change-over circuit 302 is connected to the resistors VR6 and R32 which form the shutter time control circuit. The voltage 302 thus connects the resistor R32 to the capacitor C5 in response to an LL output of the comparator CP5 and to connect the variable resistor VR6 to the capacitor C5 in response to an HL output of the comparator CP5.

An operational amplifier AR8 has its non-inversion input terminal connected to the inversion input terminal of the amplifier AR9; has its inversion input terminal connected to the ground through a resistor R14; and has a resistor R15 connected to its feedback path. The operational amplifier AR8 thus increases the constant voltage $V_{CT}$ by K times.

A silicon photo-diode SPD measures light. An operational amplifier AR2 has the silicon photo-diode SPD connected between its input terminals and also has a diode for logarithmic suppression connected to its feedback path. The operational amplifier AR2 thus forms a light measurement circuit. There is provided another operational amplifier AR1 which has a diode D2 connected between its input terminals and has its output terminal connected to the non-inversion input terminal of the other amplifier AR2, mentioned above. A posistor R33 is connected to the output terminal of the above stated light measurement circuit. The posistor R33 and the amplifier AR1 form a temperature compensation circuit for the light measurement circuit. A variable resistor VR2 and a capacitor C4 are in parallel and are connected between the inversion input terminal and the output terminal of an operational amplifier AR3. The amplifier AR3 thus forms a compensation circuit compensating for a flicker included in the light measurement output. There is provided a variable resistor VR3 for setting a shutter time value and film sensitivity information. An operational amplifier AR5, which is provided with first and second inversion input terminals, has the first inversion input terminal connected to the variable resistor VR3 and the amplifier AR3 while the second inversion input terminal is connected to the terminal b', mentioned in the foregoing. This amplifier AR5 thus forms an operational circuit to compute (for daylight photography) the information supplied to the first input terminal in response to an HL output of the comparator CP4 and to compute (for flash photography) the information supplied to the second input terminal in response to an LL output of the comparator CP4. A variable resistor VR4 sets information on the full-open F-number of a lens, which is mounted on the camera. The variable resistor VR4 is connected to an operational amplifier AR6, which has a resistor R31 connected to its feedback path. The amplifier AR6 thus forms a full-open aperture signal forming circuit which produces a voltage corresponding to a full-open aperture value. The outputs of the amplifiers AR5 and AR6 are computed at another operational amplifier AR7. The circuit includes the display meter M; a resistor R34 which has an impedance Z and is provided with a fixed contact R34b and a movable contact R34a, which moves in response to the variable resistor VR4. When the full-open aperture value set at the resistor VR4 is smaller than the value $F_2$ mentioned in the foregoing, the movable contact R34a comes into contact with the fixed contact R34b. When the setting value is larger than the value $F_2$, the movable contact R34a disengages the contact R34b. A full-open aperture information source is arranged in this manner and the information on the full-open F-number is transmitted to the terminal b' in the form of an impedance value. A reference symbol SWX identifies a synchronization switch; and reference symbol APCC identifies an aperture control circuit which controls the diaphragm aperture on the basis of the output of the amplifier AR5. When the aperture information supplied to the circuit APCC is of a value smaller than the full-open F-number, the diaphragm aperture is adjusted to the full-open F-number. Furthermore, since details of the aperture control circuit are disclosed in the specification of U.S. Pat. No. 4,265,521, further description is omitted herein. Furthermore, the portion of the camera encompassed with the broken line in FIG. 3 is composed of integrated circuits. These circuits are rendered operative with the power supply effected thereto in response to the first stroke on the release button of the camera.

The flash device of FIG. 1, according to the present invention, operates in the following manner. First, operation when the full-open F-number of the lens in use is of a value smaller than the aperture value $F_2$ is described below.

When the power source switch 2 is turned on, the DC-to-DC converter 3 operates to boost the power source voltage 1. The boosted voltage output is transmitted to the main capacitor 6 of the distance measuring light emitting circuit through the rectifying diode 5 to charge the main capacitor 6 therewith. Meanwhile, the boosted voltage output is also impressed on the main capacitor 9 of the flashing circuit through the rectifying diode 4 charging it.

Before the first stroke on the release button of the camera, the constant voltage is not impressed on the terminal a from the camera side and the output of the buffer 54' is at a low level. Accordingly, the level of the output of the comparator 51 is low. Before the first stroke on the release button, therefore, the transistor 24 is off. The charge potential of the main capacitor 9 is therefore detected through the resistors 21 and 22. Then, when the main capacitor 9 is charged to the relatively low charge level I, the comparator 50 produces an HL output as a charge completion signal therefrom.

In response to the HL output of the comparator 50, the light emitting diode 53 lights up indicating completion of the charging process. After this charge completion display, each of the circuits shown in FIG. 3 is rendered operative when the first stroke of the release operation is performed. The constant voltage $V_{CT}$ from the constant voltage source 301 is then transmitted to the terminal a via the terminal a'. As a result, the output of the buffer 54 becomes the constant voltage potential to be impressed on the terminal a. Since the constant voltage $V_{CT}$ from the camera side is set at a higher potential than the reference voltage from the constant voltage source 24', the comparator 51 produces an HL output in response to the output of the buffer 54. Then, the AND gate 128 has high level inputs impressed on both input terminals thereof. This causes the AND gate 128 to produce an HL output triggering the one-shot circuit 130 to produce a one-shot pulse. In response to this one-shot pulse, the trigger circuit 8 triggers the discharge tube 7, causing the latter to emit a flash light (hereinafter, this flashing action by the discharge tube 7 will be called pre-flashing). Since the flashing level (or the quantity of flash light) must be kept constant and unvarying because the flash light from the discharge tube 7 is used for distance movement, the charge potential of the capacitor 6 is unvarying.

With the pre-flashing action performed in this manner, a reflection light thus obtained from the object to be photographed is received by the photo-transistor PT. Assuming that the quantity of the flash light emitted is unvarying and that the reflection factor of the object is also unvarying, the photo-current of the photo-transistor PT becomes a charging current of a value inversely proportional to the square of the distance to the object. The capacitor 57 is charged with this photo-current. In other words, the one-shot pulse is transmitted to the inverter 79 through the OR gate 80. The pulse is inverted at the inverter 79 and is impressed on the transistor 68. This turns off the transistor 68 for a length of time corresponding to the width of the one-shot pulse releasing the integration circuit from a short-circuited state. Therefore, the capacitor 57 is charged with the charging current from the photo-transistor PT only during the length of time corresponding to the width of the one-shot pulse. Under this condition, the transistors 62, 63 and 64 are off. Therefore, the above photo-current is used solely for charging the capacitor 57.

With the capacitor 57 charged for a given length of time which is determined by the width of the one-shot pulse, the charge potential of the capacitor 57 becomes a voltage which is inversely proportional to the square of the distance to the object. This voltage is then converted into a digital value through an A-D converter consisting of the comparators 73, 74 and 75.

Assuming that the object is within a short distance range d0–d1 (such as 1 m–2 m), the charge potential of the capacitor 57 during the above pulse width time is at a higher level than the voltage impressed on the negative input terminal of the comparator 73. This causes all the comparators 73, 74 and 75 to produce HL outputs. These HL outputs are then transmitted to the AND gates 82, 83 and 84. Since these AND gates 82, 83 and 84 have been opened in response to the above one-shot pulse beforehand, the output of the comparators 73, 74 and 75 are transmitted to the latch circuits 85, 86 and 87. Since the latch circuits 85, 86 and 87 produce HL outputs in response to an HL output of the comparator 51 while an HL output of the comparator 51 is impressed thereon, all the latch circuits 85, 86 and 87 produce HL outputs in response to the HL outputs of the comparators 73, 74 and 75 coming through the AND gates 82, 83 and 84, when the distance to the object to be photographed is within the short distance range d0–d1.

When the object is located within a medium distance range d1–d2, for example from 2 m to 4 m, the charge voltage of the capacitor 57 becomes an intermediate potential between the potential of the negative input terminal of the comparator 74 and that of the negative input terminal of the comparator 73. The comparators 74 and 75 then produce HL outputs. This state is latched at the latch circuits 85, 86 and 87 in the same manner as in the short distance range. Then, the latch circuits 86 and 87 produce HL outputs while the latch circuit 85 produces an LL output. With a long object distance range d2–d3, such as a range from 4 m to 8 m, the charge voltage of the capacitor 57 becomes an intermediate potential between the negative input potential of the comparator 74 and that of the comparator 75. This causes the comparator 75 to produce an HL output. In this case, therefore, it is only the latch circuit 87 that produces an HL output.

Furthermore, when the distance to the object is farther than the above long distance range, for example beyond 8 m, the charge voltage of the capacitor 57 becomes lower than the negative input terminal potential of the comparator 75. This causes all the comparators 73, 74 and 75 to produce LL outputs. Therefore, the outputs of the latch circuits 85, 86 and 87 are kept at a low level.

As mentioned in the foregoing, the charge voltage of the capacitor 57 is A-D converted and a signal corresponding to the distance to an object to be photographed is latched at the latch circuits 85, 86 and 87. Then, after the lapse of a length of time corresponding to the width of the one-shot pulse, the AND gates 82, 83 and 84 are closed to inhibit information being supplied to the latch circuits 85, 86 and 87. After that, the latch circuits 85, 86 and 87 are in the same output condition until the output level of the comparator 51 becomes low. Furthermore, after the lapse of the one-shot pulse width time, the transistor 68 is turned on to reset the electric charge of the capacitor 57 and to inhibit the integrating action of the integration circuit. Since the distance measurement by the pre-flashing action does not require a large quantity of flash light and, accordingly, the discharge time is less than 10 $\mu s$, the width of the one-shot pulse is about 10 $\mu s$.

The latch circuits 85, 86 and 87 produce HL outputs when the object to be photographed is located within a short distance range d0–d1, as mentioned in the foregoing. In that case, therefore, the HL output of the latch circuit 85 is impressed on one of the input terminals of the AND gate 94. Meanwhile, an HL output of the comparator 51 is impressed on the other input terminal of the AND gate 94. Therefore, the AND gate 94 produces an HL output lighting up the light emitting diode 107 indicating that the object to be photographed is located within the short distance range d0–d1 and that the designated aperture value for flash photography is a small aperture $F_0$, such as F8. At that instant, the AND gate 95 has the output of the latch circuit 85 impressed thereon after the HL output of the latch circuit 85 has been converted to an LL output through the inverter 90. Meanwhile, the HL output of the latch circuit 86, which has been converted to an LL output through the inverter 91 and the OR gate 88, is impressed on the AND gate 96. Accordingly, the light emitting diodes 106 and 105 are respectively unlit.

Furthermore, the HL outputs of the latch circuits 85, 86 and 87 turn the transistors 113, 114 and 115 on, connecting the aperture information resistors 116, 117 and 118 in parallel relative to the resistor 120. In other words, the HL outputs of the latch circuit 85 are impressed directly on the base of the transistor 113, turning on the transistor 113. The HL output of the latch circuit 86 is impressed on one of the input terminals of the AND gate 166 through the OR gate 88. The HL output of the latch circuit 87 is impressed on one of the input terminals of the AND gate 109 through the OR gate 89. Meanwhile, the HL output of the latch circuit 86 is inverted to LL through the inverter 92 and is then impressed on the AND gate 98 causing the AND gate to produce an LL output. This in turn causes the inverter 108 to produce an HL output. Therefore, each of the above AND gates 160 and 109 has an HL input also impressed on the other input terminal thereof. Accordingly, the AND gates 160 and 109 also produce HL outputs turning on the transistors 114 and 115. If the object distance d0–d1 is short, the transistors 113, 114 and 115 are turned on to have resistors 116, 117 and 115 connected in parallel relative to the resistor 120.

With the resistors 116, 117 and 118 connected in parallel relative to the resistor 120, the output voltage of the buffer 121 becomes $V_0$. The potential of the inversion input terminal of the amplifier 123 also becomes $V_0$ to have the voltage $v_0$ produced at the terminal b.

On the other hand, since the output of the comparator 50 is at a high level (HL) as mentioned in the foregoing, the transistor 41 turns on. This allows a current, which is based on the constant voltage $V_{CT}$ supplied from the camera side to the terminal a in response to the first stroke of the release device, to flow in through the resistor 56. At the terminal a, therefore, there flows a current $i = V_{CT}/R56$ (where $V_{CT}$ represents the constant voltage supplied from the camera side to the terminal a and R56 the resistance value of the resistor 56. This current value is detected by the detection circuit disposed on the camera side. Accordingly, the operation mode of the camera has been switched over from a daylight photography mode to a flash-light photography mode. More specifically stated, with the above stated current $i = V_{CT}/R56$ flowing to the terminal a through the terminal a' shown in FIG. 3, the output potential of the amplifier AR9 increases by a value of resistor R13 X i. This causes the comparators CP4 and CP5 respectively to produce LL outputs. As a result, the amplifier AR5 is shifted to an operation mode for flash photography. Meanwhile, the change-over circuit 302 connects the resistor R32 to the capacitor C5 forming a shutter time circuit for flash photography. With the operation of the amplifier AR5 shifted to a flash photography operating condition, the above voltage $V_0$ and the full-open aperture information from the amplifier AR6 are computed to obtain one of the stepwise aperture values according to the voltage $V_0$. Then, the aperture value information is supplied to the aperture control circuit APCC. Accordingly, the camera is shifted to the flash photography mode. The shutter time circuit is prepared for flash photography while the aperture control circuit receives the voltage $V_0$, which by then has become a value corresponding to the aperture value $F_0$ (for example, F8). The light emitting diode 107 then indicates the aperture value and the distance to the object. After the camera has shifted to the flash photography mode, the diaphragm mechanism of the camera operates when a second stroke is applied to the release button. The aperture control circuit APCC adjusts the diaphragm aperture according to the voltage $V_0$ of the terminal b to the aperture value $F_0$ (such as F8) designated for flash photographing an object located nearby. The leading shutter curtain travels to initiate an exposure. The count switch SW4 of the camera is turned off by the travel of the leading shutter curtain. Then, a count action for a flash photography shutter time begins. The synchronization switch SWX operates and an LL signal is supplied to the terminal c. This LL signal is inverted by the inverter 127 into an HL signal. The HL signal is impressed on one of the input terminals of the AND gate 132 which has the HL output of the comparator 50 impressed on the other input terminal thereof. The AND gate produces an HL output to trigger the one-shot circuit 131. The one-shot circuit 131 then produces a one-shot pulse. The one-shot pulse is transmitted to the trigger circuit 10 to actuate it. This turns on the thyristor 18 and also supplies a trigger pulse to the flash discharge tube 13. The discharge tube 13 flashes for flash photography. Meanwhile, the one-shot pulse is transmitted to the transistor 68 through the OR gate 80 and the inverter 79 turning off the transistor 68. With the transistor 68 turned off, the integration circuit begins to operate. The one-shot pulse is further transmitted to one of the input terminals of each of the AND gates 76, 77 and 78. On the other input terminal of the AND gate 76 is impressed the HL output of the latch circuit 85. The AND gate 77 has the HL output of the latch circuit 86 impressed on the other input terminal thereof through the OR gate 88. Meanwhile, the HL output of the latch circuit 87 is impressed on the other input terminal of the AND gate 78 through the OR gate 89. Accordingly, the outputs of all these AND gates 76, 77 and 78 become HL turning on the transistors 62, 63 and 64. With a short distance, all the capacitors 58, 59 and 60 are connected in parallel relative to the capacitor 57. The capacity of each of these capacitors 57, 58, 59 and 60 is set in such a way that the capacitor capacity of the integration circuit becomes a value corresponding to the aperture value $F_0$ when these capacitors 57, 58, 59 and 60 are connected in parallel. Therefore, the light adjusting condition of the light adjustment circuit operating as the integration circuit is set at a value according to the above designated aperture value.

In the process of carrying out an integrating action with the capacity of the integration circuit adjusted according to the designated aperture value and when the charging voltage for the capacitor 73 resulting from a photo-current of the photo-transistor PT which receives light from the object resulting from the flash light reaches the negative terminal potential of the comparator 73, the comparator 73 produces an HL output. This HL output of the comparator 73 is transmitted to one of the input terminal of the AND gate 81. Since the pulse from the above one-shot circuit 131 is impressed on the other input terminal of the AND gate 81, the AND gate 81 produces an HL output in response to the HL output of the comparator 73. This turns on the thyristor 19. The electric charge of the commutation capacitor 14 is discharged turning off the thyristor 18 by reversely biasing it. This causes the flash discharge tube 13 to stop flashing and thus brings the flashing action of the flash device to an end.

Figure 4A:
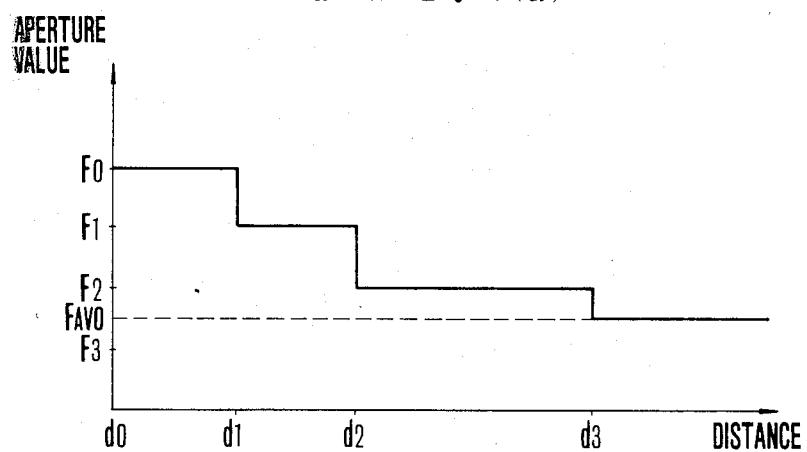
FIGS. 4(a) and (b) are illustrations showing the operation of the embodiment shown in FIG. 1.

As described above, where the object is a short distance away, the diaphragm aperture is set at $F_0$, that is, the aperture is set on the smaller aperture side as shown in FIG. 4($a$). Then, the light adjusting condition is also adjusted to a value corresponding to the aperture value $F_0$. With the flashing action thus carried out, the shutter closes to flash photography after the lapse of the shutter time for flash photography.

Next, the operation for an object located within a distance range of d1-d3 is as follows: In this case, as has been described in the foregoing, the pre-flashing action for distance measurement has caused the latch circuits 86 and 87 to produce HL outputs and the latch circuit 85 to produce an LL output. Therefore, the AND gate 94 produces an LL output and the AND gate 95 an HL output, while the AND gate 96 produces an LL output. This causes the light emitting diode 106, instead of the light emitting diode 107, to light up indicating that the object is within a medium distance range d1-d2 and that the aperture value is $F_1$ (for example F4) which is closer to the full-open aperture than the above stated aperture value $F_0$.

Meanwhile, the LL output of the latch circuit 85 turns off the transistor 113. The transistors 114 and 115, on the other hand, turn on in the same manner as in the above described short distance. With the medium distance, the resistors 117 and 118 are connected to the resistor 120 and a voltage $V_1$ which is of a higher potential than the above stated voltage $V_0$ is produced at the terminal b. Since this voltage $V_1$ corresponds to the aperture value $F_1$, information on the aperture value $F_1$ is transmitted to the aperture control circuit APCC of the camera in the same manner as described in the foregoing. When the second stroke is given to the release button, the diaphragm aperture is adjusted to the aperture value $F_1$ according to the voltage $V_1$ from the terminal b in the same manner as described in the foregoing. Then, the flash discharge tube 13 and the integration circuit performs an integrating action on the total flash light. The flashing action ends when the terminal voltage of the capacitor of the integration circuit reaches a predetermined value, i.e., the negative terminal voltage of the comparator 73. Meanwhile, the shutter time is adjusted to the shutter time value for flash photography. Furthermore, when there is a medium distance, since the latch circuit 85 is producing an LL output, the AND gate 76 produces an LL output turning the transistor 62 off. The AND gates 77 and 78, on the other hand, produce HL outputs in the same manner as with short distances having the transistors 63 and 64 on. In this condition, therefore, the capacitors 59 and 60 are connected in parallel relative to the capacitor 57. Accordingly, the capacity of the integration circuit is smaller than when the distance is short. Therefore, the light adjustment condition is set at a condition corresponding to the aperture value $F_1$ during the light quantity integrating action performed by the integration circuit. The light emitting diode 106 then indicates that the aperture value is $F_1$ and the distance to the object is d1-d2. In the meantime, as shown in FIG. 4($a$), the aperture is set at the aperture value $F_1$ which is closer to the full-open value than the aperture value $F_0$, which is used for the short distance. The light adjustment condition is also set at a value corresponding to the aperture value $F_1$.

The operation for an object located at a great distance d2–d3 is as follows: As a result of the pre-flashing action which is performed for distance measurement in the same manner as described in the foregoing, the latch circuits 85 and 86 produce LL outputs while the latch circuit 87 produces an HL output therefrom. Furthermore, the full-open F-number of the photo-taking lens in use in this situation is small. In other words, the camera is using a lens with a large aperture, such as F1.0 or the like. Therefore, as will be further described later herein, the impedance of the full-open F-number information source is detected and the comparator 122 is producing an LL output.

Assuming that the resistance value of the resistor 125 is R1, that of the resistor 126 R2, impedance between the terminal b' shown in FIG. 3 and the ground Z, the voltage of the terminals b $V_{AV}$, the output of the amplifier 123 $V_{OUT}$ and the middle point between the resistors 125 and 126 VR, the following relation is attained:

$$VR = V_{OUT} \frac{R2}{R1 + R2} \quad V_{OUT} = V_{AV}\left(1 + \frac{R3}{Z}\right)$$

Since the condition for obtaining the HL output of the comparator 122 is $VR < V_{AV}$, the following relation is attained:

$$V_{AV}\left(\frac{R2}{R1 + R2}\right)\left(1 + \frac{R3}{Z}\right) < A_{AV}$$

From this is derived:

$$Z > \frac{R3R2}{R1} = Z > C$$

(constant value). When the impedance of the resistor R34 is set at a value smaller than C and, a lens of full-open F-number larger than the value $F_2$ is mounted on the camera, the resistor R34 is opened. Therefore, the comparator produces an HL output. If the full-open F-number of the lens mounted on the camera is smaller than the value $F_2$, the comparator 122 produces an LL output because the resistor R34 is connected between the terminals b and b' and the ground. With the LL output produced from the comparator 122, the output of the OR gate 88 also becomes LL. Accordingly, the AND gate 95 produces an LL output. The AND gate 96 has its input terminals receiving an HL input which is obtained by inverting the LL output of the OR gate 88 through the inverter 91, another HL input coming from the latch circuit 87 through the OR gate 89 and a further HL input which comes from the comparator 51. Accordingly, the AND gate 96 produces an HL output. Therefore, where the object to be photographed is at a great distance, only the light emitting diode 105 lights up indicating that the object is at the long distance d2–d3 and that the aperture value is $F_2$ (for example, F2) is closer to the full-open aperture than the aperture value $F_1$.

Since the latch circuit 87 alone produces an HL output while the comparator 122 is producing an LL output, the transistors 113 and 114 turn off while the transistor 115 alone turns on. More specifically stated, the transistor 113 is off because the latch circuit 85 is producing an LL output. The AND gate 160 produces an LL output because the OR gate 88 is producing the LL output. The LL output of the AND gate 160 causes the transistor 114 to turn off. Furthermore, since the LL output of the comparator 122 is supplied to the AND gate 98, the AND gate 98 produces an LL output. The LL output of the AND gate 98 is inverted to an HL signal through the inverter 108 and is impressed on one of the input terminals of the AND gate 109. Since the HL output of the latch circuit 87 is impressed through the OR gate 89 on the other input terminal of the AND gate 109, the AND gate 109 produces an HL output, which turns on the transistor 115. When the object's distance is great, it is only the transistor 115 that turns on while the transistors 113 and 114 turn off. With the transistor 115 turned on alone, the register 118 is solely connected to the resistor 120. As a result of this, voltage $V_2$ (corresponding to the aperture value F2), which is of a higher potential than the voltage $V_1$, is produced at the terminal b. Then, the voltage $V_2$ is transmitted to the camera aperture control circuit APCC.

Following that, when the second stroke is applied to the release button, the diaphragm aperture of the camera is adjusted to the aperture value $F_2$ according to the voltage $V_2$ from the terminal b. Meanwhile, the flash discharge tube 13 flashes and the integration circuit performs an integrating action on the flash light quantity. The flashing action ends when the terminal potential of the capacitor of the integration circuit reaches the negative terminal potential of the comparator 73. The shutter time is adjusted to the shutter time value for flash photography. Since the latch circuit 85 is producing the LL output and the OR gate 88 is also producing the LL output, the outputs of the AND gates 76 and 77 become LL while the AND gate 78 alone produces an HL in the same manner as with the short distance. Accordingly, the transistors 62 and 63 turn off. The transistor 64 alone turns on, having the capacitor 60 alone connected in parallel to the capacitor 57. Therefore, the capacity of the integration circuit becomes smaller than the capacity obtained with the medium distance and thus the light adjusting condition for the light quantity integrating action by the integration circuit is set to a condition corresponding to the aperture value $F_2$.

When using the long distance d2–d3, the diode 105 thus indicates that the aperture value is $F_2$ and the object's distance is d2–d3. Meanwhile, the diaphragm is set at the aperture value $F_2$, which is closer to the full-open aperture than the aperture value $F_1$ for the medium distance. The light adjusting condition is also set at a value corresponding to the aperture value $F_2$. Flash photography is carried out under these conditions.

When the object to be photographed is located at a distance farther than the distance d3, the operation is as follows: The pre-flashing action is performed for distance measurement, as mentioned in the foregoing. As a result of the pre-flashing action, all the latch circuits 85, 86 and 87 are producing LL outputs. Therefore, the inverter 93 produces an HL output and this HL output is impressed on one of the input terminals of the AND gate 97. The AND gate 97, on the other hand, has the HL output of the comparator 51 impressed on the other input terminal thereof. The AND gate 97 therefore produces an HL output in response to the HL input from the inverter 93. The HL output of the AND gate 97 comes through the OR gate 99, lighting up the light emitting diode 104. The light emitting diode 104 thus indicates that a proper exposure cannot be made at the charge level. The HL output produced through the OR gate 99 is impressed on the base of the transistor 24 turning it on. As a result, the resistor 23 is connected in parallel to the resistor 22 to set the charge completion detection level at a high value. The above stated level I is thus shifted to another level II. The shift to the charge level II extinguishes a charge completion signal (an HL signal), which has been produced from the comparator 50. The comparator 50 then produces an LL output. The light emitting diode 53 is extinguished and the transistor 41 turns off. A mode change-over current, which has been flowing to the terminal a, disappears. The photography mode of the camera is shifted to a mode for daylight photography inhibiting flash photography. After the shift to the level II, the main capacitor 9 is further charged and when the charge level of the main capacitor 9 reaches the level II, the comparator 50 again produces a charge completion signal (an HL signal). Therefore, if the release operation is kept at the first stroke thereof, the AND gate 128 produces an HL output in response to the HL output of the comparator 50. With the HL output produced from the AND gate 128, the one-shot circuit 130 is again triggered. Then, the distance measuring discharge tube again emits a flash light in the same manner as described in the foregoing. Distance measurement by pre-flashing is thus once again carried out. The contents of the latch circuits 85, 86 and 87 are determined according to the distance to the object to be photographed. The transistor 41 also turns on again and the mode of the camera is shifted back to the flash photography mode. Assuming that the distance to the object remains the same, that is, if the object stays at a distance beyond d3, all the latch circuits 85, 86 and 87 produce LL outputs. Accordingly, the transistor 113 turns off. The LL outputs of the latch circuits 86 and 87 are applied to one of the input terminals of the OR gates 88 and 89. Furthermore, since the comparator 122 is producing an LL output, input signals to the other input terminals of the OR gates 88 and 89 are also at LL. The OR gates 88 and 89 then transmit the LL signals to the AND gates 160 and 109. This causes the AND gates 160 and 109 to produce LL outputs which turn off transistors 114 and 115. Accordingly, in this situation, a voltage $V_3$, which is defined through the resistors 120 and 119 at a value corresponding to an aperture value $F_3$ which is smaller than the full-open F-number of an ordinary lens, is produced at the terminal b. After the second flashing action for distance measurement, the discharge tube 13 emits a flash light in response to the second stroke on the release button in the same manner as the processes subsequent to the second stroke, described in the foregoing. Meanwhile, the diaphragm aperture of the camera is adjusted to the aperture value $F_3$ according to the voltage $V_3$. If, in this case, the full-open F-number of the lens in use is an aperture value $F_{AVO}$ which is larger than the value $F_3$, the aperture is adjusted to the full-open F-number. Furthermore, since the OR gates 88 and 89 and the latch circuit 85 are producing the LL outputs respectively, the AND gates 76, 77 and 78 also produce LL outputs and the transistors 62, 63 and 64 are off. When the object is located at a distance beyond the distance d3, the capacitor capacity of the integration circuit is determined solely by the capacitor 57. Since the capacitor 57 is of a capacity corresponding to the full-open F-number of lenses ordinarily used, the light adjusting condition is set at a value corresponding to an aperture value for flash photography.

Furthermore, if the resistance value of the resistors 119 and 120 is set at a value either corresponding to or slightly larger than the full-open F-number of lenses to be ordinarily used and if the capacity of the capacitor 57 is set at a value corresponding to the F-number, the aperture value for an object located at a distance exceeding d3 is always adjusted to a value either at the full-open F-number or to a value slightly larger than the full-open aperture value. Then, the light adjusting condition can also be set at a value corresponding to the F-number. Such an arrangement ensures a proper exposure.

In the flash device according to the invention as described above, the charge level of the main capacitor 57 is set at a relatively low level I when the distance to the object is within a relatively short distance not exceeding the distance d3. In that case, the preparation for flash photography can be completed in a relatively short period of time. When the object is located at a distance which is farther than the distance d3 and is beyond an adequately operable range with the flash light quantity available from the charge level I of the main capacity 57, the charge level is shifted to a higher charge level II to ensure accurate control over the flash light quantity. Besides, when the object to be photographed is located at a great distance, flash photography can be accomplished with a shorter waiting time than with conventional flash devices.

The above description covers a situation where the distance to the object is detected to be still farther than the distance d3 through distance measurement accomplished by a second pre-flashing action and then the LL signals are latched at the latch circuits 85, 86 and 87 respectively. However, when the distance to the object has become shorter than the distance d3 at the time of the second distance measurement, the output conditions of the latch circuits 85, 86 and 87 are, of course, determined according to the distance to the object detected by the second distance measurement and the aperture value is also determined accordingly.

Next, when photography is carried out with a lens of a greater full-open aperture value than the aperture value $F_2$, the embodiment operates as follows: For objects located at a short distance d0–d1 and a medium distance d1–d2, both the aperture and the quantity of flash light are controlled in exactly the same manner as when the lens in use is of a full-open aperture value which is smaller than the aperture value $F_2$. However, if the distance to the object is farther than the distance d2, flash photography is carried out with the aperture controlled according to the full-open F-number.

Figure 4B:
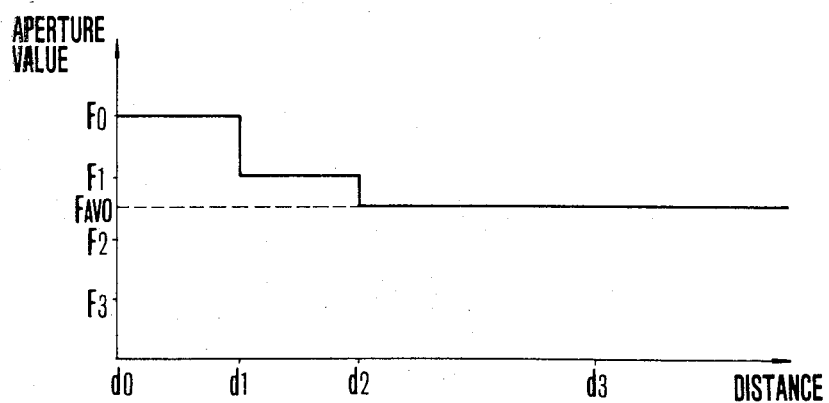

More specifically, in this case, the latch circuit 86 produces an LL output as a result of distance measurement by pre-flashing. Accordingly, the output is inverted through the inverter 92 and an HL signal thus obtained is impressed on the first input terminal of the AND gate 98. Meanwhile, the outputs of the comparators 122 and 51 are impressed on other input terminals of the AND gate 98. The comparator 51 is producing an HL output, as mentioned in the foregoing. The comparator 122 is also producing an HL output because the full-open F-number of the lens in use is larger than the aperture value $F_2$. All the input signals to the AND gate 98 are therefore HL signals. Accordingly, the AND gate 98 produces an HL output. The HL output of the AND gate is transmitted to the transistor 24 through the OR gate 99, turning on the transistor. Therefore, the charge level is shifted from the level I to the level II in the same manner as described previously. When the main capacitor 9 reaches the charge level II, the discharge tube 7 again flashes for distance measurement. When the distance to the object exceeds the distance d2 by this distance measurement, the content of the latch circuit 86 is held at an LL. Accordingly, the AND gate 98 produces an HL output. This HL output is inverted to an LL signal at the inverter 108 and is transmitted to the AND gates 160 and 109. Therefore, when the distance to the object is more than the distance d2, the AND gates 160 and 109 produce LL outputs, which turn off the transistors 114 and 115. Meanwhile, the transistor 113 is also turned off by the LL output of the latch circuit 85. Therefore, the voltage V3 which corresponds to the aperture value $F_3$ is supplied to the terminal b. Then, upon the second stroke on the release button, the discharge tube 13 flashes to accomplish flash photography. Meanwhile, the aperture control circuit APCC of the camera adjusts the diaphragm aperture in accordance with the voltage V3. Since the full-open aperture value of the lens is larger than the value $F_2$ as mentioned above, the diaphragm mechanism adjusts the aperture to the full-open value. Referring to FIG. 4(b), when the distance to the object is more than the distance d2, the diaphragm aperture is thus adjusted to the full-open F-number. At that instant, the LL output of the latch circuit 85 is transmitted to the AND gate 76. Furthermore, the AND gates 77 and 78 have the HL output of the comparator 122 transmitted thereto through the OR gates 88 and 89. The transistor 62 is off. The transistors 63 and 64 are on. The capacitors 59 and 60 are connected to the capacitor 57. Therefore, when the distance to the object is more than the distance d2, the capacity of the integration circuit, i.e., the light adjusting condition is adjusted to a value corresponding to the aperture value $F_1$. Again referring to FIG. 4(b), although the aperture value $F_1$ and the value $F_{AVO}$ are not the same value, the light adjusting condition is adjusted to a value approximately corresponding to the value $F_{AVO}$ because the value $F_{AVO}$ is between the above stated value $F_2$ and the value $F_1$.

Figure 5:
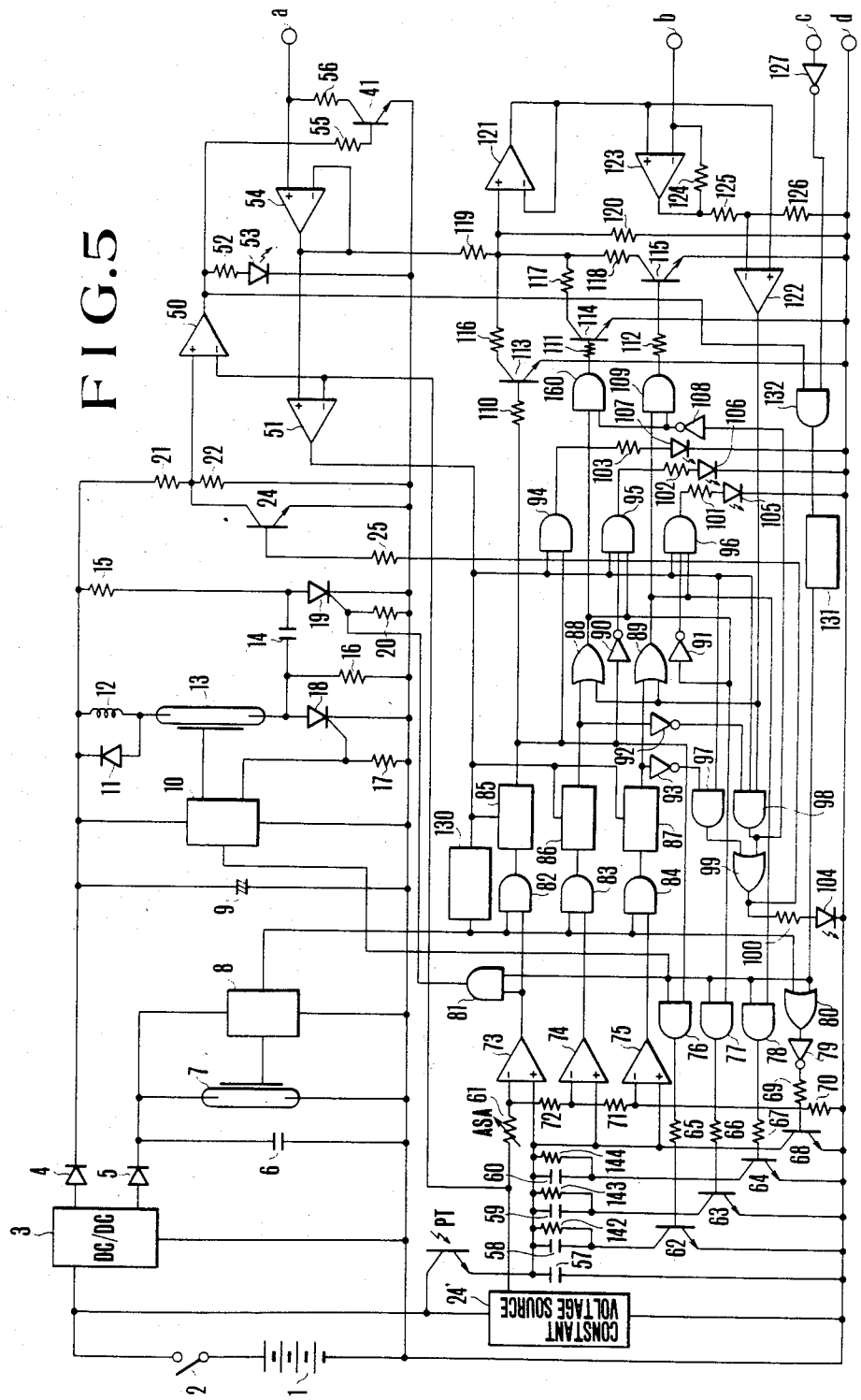
FIG. 5 is a circuit diagram showing a flash device in another embodiment of the invention.

FIG. 5 is a circuit diagram showing a flash device in another embodiment of the present invention. In FIG. 5, the parts of the embodiment identical with those of the first embodiment shown in FIG. 1 are indicated with the same reference numerals and symbols as those used in FIG. 1. This embodiment differs from the first embodiment shown in FIG. 1 in the following points: The one-shot circuit 131 is triggered directly by the output of the comparator 51. The resistor 23 which is series connected to the transistor 24 is removed and the transistor 24 is set up so that after it turns on, the flashing action of the flash device is inhibited and the photography mode of the camera is shifted to the mode for daylight photography.

Figure 6A:
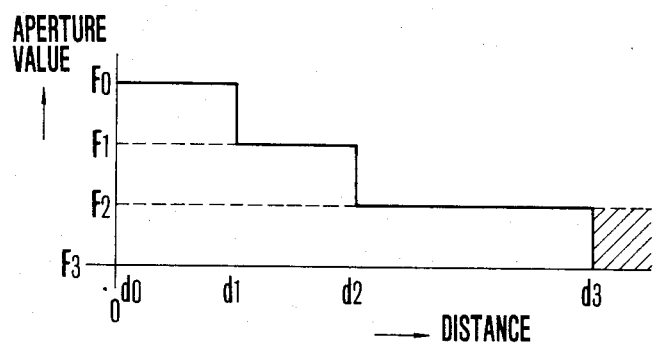
FIGS. 6(a) and (b) are illustrations showing the operation of the embodiment shown in FIG. 5.

The operation of this embodiment shown in FIG. 5 is as follows: When the full-open aperture of the lens in use is brighter than the aperture value $F_2$ and the object to be photographed is located at a distance within any of the distance ranges d0–d1, d1–d2 or d2–d3, the diaphragm aperture is controlled to one of the aperture values $F_0$, $F_1$ or $F_2$ as shown in FIG. 6(a) and the light adjusting action is performed in exactly the same manner as in the first example shown in FIG. 1. Therefore, further description is unnecessary and omitted herein.

When the distance to the object exceeds the distance d3, all the latch circuits 85–87 produce LL outputs in the same manner as described in the foregoing. As a result, the OR gate 99 produces an HL output. The light emitting diode 104 lights up to indicate that the object is located at a distance beyond the adequately operable range. The transistor 24 turns on. The potential of the non-inversion input terminal of the comparator 50 drops resulting in an LL output of the comparator 50. The transistor 41 turns off, cutting off the current flowing to the flash device from the camera. Accordingly, the output level of the amplifier AR9, which is shown in FIG. 3, drops. Both the comparators CP4 and CP5 produce HL outputs. The operating mode of the amplifier AR5 is shifted from a mode for flash photography to a daylight photography mode. The light measurement output from the light measurement amplifier AR2, which is supplied to the first input terminal of the amplifier AR5, and the shutter time information, which is set through the resistor VR3, are computed at the amplifier AR5 to obtain a computed aperture value corresponding to the brightness of the object to be photographed. The change-over circuit 302 selects the resistor VR6 and connects it to the capacitor C5 in response to an HL signal from the comparator CP5. Therefore, when a second stroke is applied to the release button on the camera, the aperture control circuit APCC adjusts the diaphragm to an aperture value for daylight photography while the shutter time is adjusted to a shutter time value preset at the resistor VR6. The exposure is thus controlled in the daylight photography mode. Furthermore, since the comparator 50 is producing an LL output at this instant, the AND gate 132 is also producing an LL output. Therefore, even when the synchronization switch SWX turns on, the discharge tube 13 remains incapable of flashing. In this embodiment, therefore, photography is performed in the daylight photography mode when the object is located beyond the adequately operable distance.

Figure 6B:
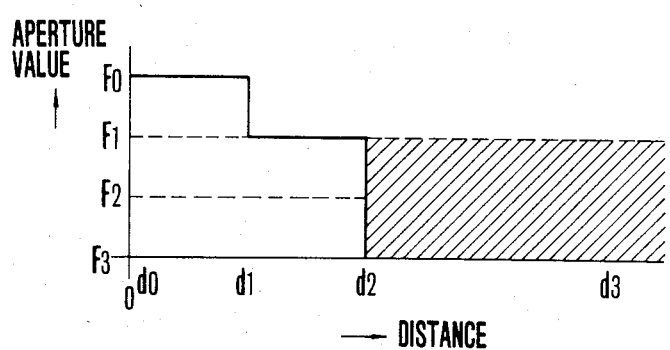

When the full-open F-number of the lens in use is darker than the aperture value $F_2$, the embodiment operates as follows: If the distance to the object to be photographed is within any of the distance ranges d0–d1 to d1–d2, the diaphragm aperture is controlled according to the aperture value $F_0$ or $F_1$ as shown in FIG. 6(b) and flash photography is performed in the same manner as in the first embodiment shown in FIG. 1.

If the distance to the object is farther than the distance d2, the latch circuit 86 produces an LL output. Meanwhile, since the lens in use is darker than the aperture value $F_2$, the comparator 122 is producing an HL output. Accordingly, the AND gate 98 produces an HL output and the OR gate 99 also produces an HL output, turning the transistor 24 on. Therefore, in this instance, flash photography is inhibited in the same manner as described in the foregoing. The diaphragm aperture is controlled in the daylight photography mode and photography is carried out in that mode. In this embodiment, as has been described above, photography is performed in the daylight mode when the object to be photographed is located beyond the adequately operable distance range of the flash device.

Figure 7:
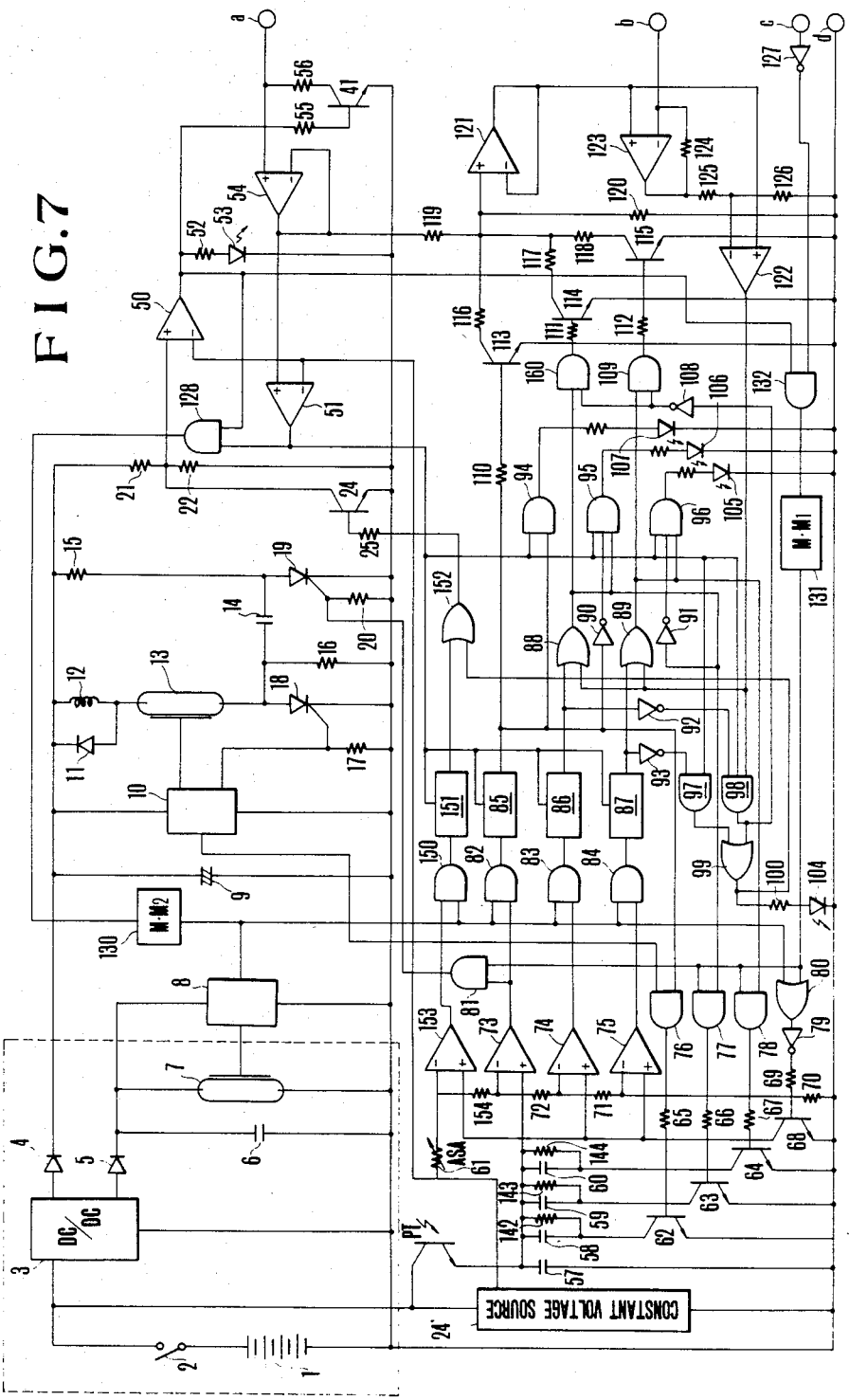
FIG. 7 is a circuit diagram showing a flash device in a further embodiment of the invention.

A flash device in a further embodiment of the invention is shown in the circuit diagram of FIG. 7. In FIG. 7, the same parts as those shown in other embodiments shown in FIGS. 1 and 5 are indicated with the same reference numerals and symbols. This embodiment differs from the embodiment shown in FIG. 5 in the following points: There are added a comparator 153, an AND gate 150, a latch circuit 151, and an OR gate 152 which are provided in addition to those parts in the embodiment shown in FIG. 5. With these parts added, flash photography is inhibited and photography is carried out in the daylight photography mode not only when the object is located at an excessively long distance but also when the object is located at a distance shorter than the distance d0.

Referring to FIG. 7, the embodiment operates as follows:

When the full-open aperture value $F_{AVO}$ of the lens in use is smaller (or brighter) than the aperture value $F_2$ and when the object to be photographed is located at a distance within any of the distance ranges d0–d1, d1–d2, d2–d3 or farther than d3, the diaphragm aperture is controlled according to the aperture values $F_0$, $F_1$ and $F_2$ or in the daylight photography mode, when applicable, in exactly the same manner as in the embodiment shown in FIG. 5. Thus, flash photography is carried out when the distance to the object is within the range of from d0 to d3 and daylight photography is carried out when the distance to the object is farther than the distance d3. The operation in these instances, therefore, requires no further description.

However, if the distance to the object is nearer than the distance d0, the pre-flashing action results in a high level output of the capacitor 57, which is higher than the inversion input terminal potential of the comparator 153. In that instance, therefore, the comparator 153 produces an HL output, which is then transmitted through the AND gate 153 and is held at the latch circuit 151. Therefore, an HL signal from the latch circuit 151 is transmitted to the base of the transistor 24 through the OR gate 152. This turns on the transistor 24. In this instance, therefore, the photography mode is shifted from the flash photography mode to the daylight photography mode in the same manner as in a distance longer than the distance d3. An exposure is then effected in the daylight photography mode in response to the second stroke on the release button of the camera.

The embodiment is such that, when the object is located at a distance outside of an adequately operable range for flash photography, the exposure is automatically controlled in the daylight photography mode to ensure adequate exposure control.

Figure 8A:
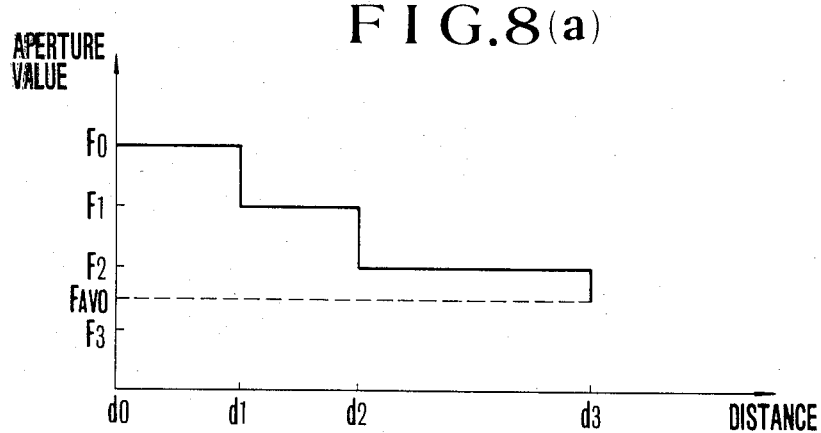
FIGS. 8(a) and (b) are illustrations showing the operation of the embodiment shown in FIG. 7.
Figure 8B:
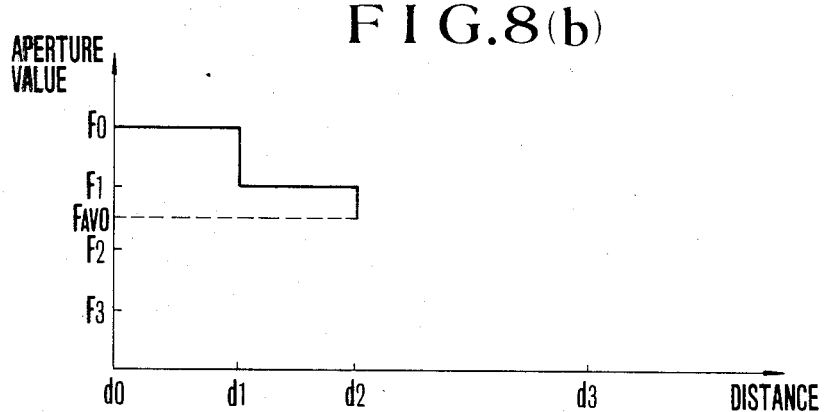

When photography is to be carried out with a lens of a full-open aperture value $F_{AVO}$ which is larger than the aperture value $F_2$, the embodiment operates in the following manner: If the object is located at a distance within the distance range d0–d1, d1–d2 or farther than d2, the diaphragm aperture is controlled in accordance with the aperture value $F_0$, $F_1$ or an aperture value for daylight photography as shown in FIG. 8(b), in the same manner as in the embodiment shown in FIG. 5. With the distance to the object within the distance range of d0–d2, flash photography is performed. Daylight photography is performed if the distance to the object is farther than the distance d2. These operations require no further description.

If the distance to the object is nearer than the distance d0, on the other hand, photography is carried out in the daylight photography mode, in the same manner as when a smaller full-open F-number than the aperture value $F_2$ is used, because the HL signal is held at the latch circuit 151.

In accordance with the embodiment shown in FIG. 7, photography is carried out in the daylight photography mode both when the object's distance is nearer than d0 and when the distance is farther than d3.

Figure 9:
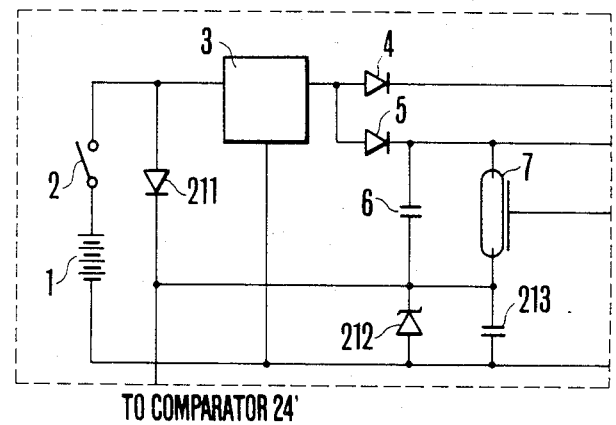
FIG. 9 is a circuit diagram showing a modification of a portion of the power supply circuit portion of the embodiment shown in FIG. 7.

FIG. 9 is a circuit diagram showing, as another embodiment, the power circuit and the distance measuring flash circuit which are enclosed with a broken line in FIG. 7. In FIG. 9, the same parts as those shown in FIG. 7 are indicated with the same reference numerals. In FIG. 9, however, a diode 211 is connected between the input terminal of the DC-to-DC converter 3 and the constant voltage circuit 24'. A zener diode 212 is connected in series with the auxiliary capacitor 6. Furthermore, a capacitor 213 is connected in series to the auxiliary discharge tube 7. The cathodes of the diode 211 and the zener diode 212 and the capacitor 213 are also connected. This embodiment thus differs from the arrangement of FIG. 7. With the power circuit arranged in this manner, even if the output voltage of the battery 1 drops when the pre-flashing action is performed for distance measurement, the power supply can be stably maintained to the load circuits of the flash device (such as the constant voltage source 24' and the integration circuit) to prevent any erroneous actions from occurring due to variation in the battery voltage.

Referring to FIG. 9, when the power source switch 2 is turned on, the capacitor 213 is charged with the current from the battery 1 through the diode 211 until the charge potential of the capacitor 213 becomes about equal to the battery voltage. The auxiliary capacitor 6 is charged with the DC-to-DC converter 3 output. When the auxiliary capacitor 6 is discharged for pre-flashing, the output voltage of the battery 1 drops. However, the electric charge of the capacitor 213 is discharged to the constant voltage source and, at the same time, a charging current for the capacitor 6 after pre-flashing is supplied to the constant voltage source by the output of the DC-to-DC converter 3 through the diode 5 and the capacitor 6. Therefore, even when the battery voltage drops by pre-flashing, stable output can be supplied to the above load circuits of the flash device. Therefore, when the power circuits employed in the embodiments shown in FIGS. 1, 5 and 7 are replaced with the power circuit of FIG. 9, the output of the circuit is always evenly supplied to the load circuits even if the battery voltage drops, so that erroneous actions due to a drop in the battery voltage can be effectively prevented.

When the electric charge of the capacitor 213 is discharged as mentioned above, the terminal potential of the capacitor 213 also drops. However, since the charging current for the capacitor 213 is supplied by the output of the DC-to-DC converter 3 through the diode 5 and the capacitor 6 as mentioned above, the terminal potential of the capacitor 213 is almost unvariable in spit of the discharge maintaining stable power supply to the load circuits of the flash device.

The outside apperances of the flash devices shown in FIGS. 1, 5 and 7 are shown in FIGS. 10(a) and (b).

Referring to FIG. 10(a), the body 200 of the flash device contains therein the above flash photography main discharge tube 13 which is secured to a reflection shade 201; the distance measuring auxiliary discharge tube 7 which is secured to another reflection shade 202; and the photo-transistor which measures a reflection light coming from an object through a condenser lens PTa. A protection panel made of an acrylic resin material is disposed in from of a main flashing part which includes the main discharge tube 13. This panel is carried by parts 200a and 200b of the casing of the flash devie body 200. A filter 204 which transmits only infrared rays to prevent the person or persons being photographed from feeling uncomfortable, is disposed in from of a pre-flashing part which includes the auxiliary discharge tube 7. The filter 204 is carried by parts 200b and 200c of the casing of the flash device body 200 and thus serves as a protection panel. The main flashing part is provided with a Fresnel lens 206 which is carried jointly by parts 207a and 207b of the casing of an adapter 207. The pre-flashing part is provided with the Fresnel lens 206, which is carried jointly by parts 207b and 207c of the casing of the adapter 207. The casing of the adapter 207 includes the parts 207a, 207b and 207c which are in one unified body and which make the projection angles of the main flashing part and the pre-flashing part variable. The part 207a is slidable over the part 200a of the casing of the body 200. The part 207b is slidable along a groove formed by the part 200b of the casing of the body 200. Meanwhile, the part 207c is slidable over the part 200c of the casing of the body 200. The flash device is provided with a mounting leg which fittingly engages a hot shoe disposed on the camera side.

Figure 11:
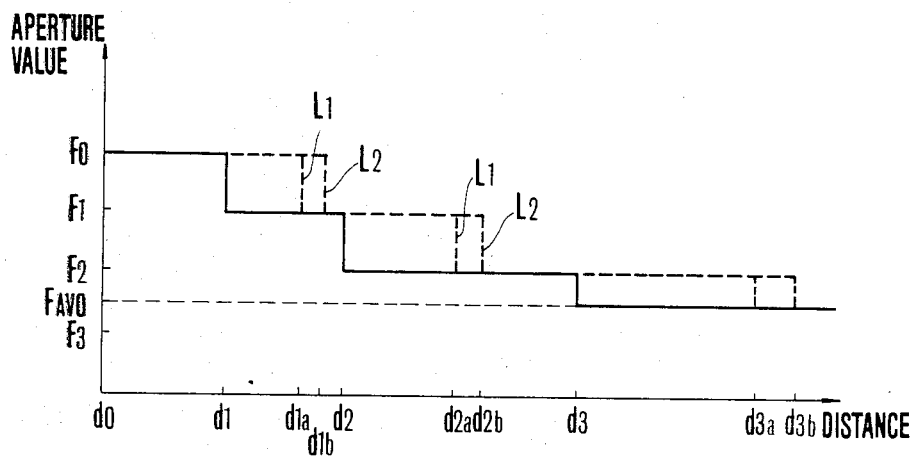
FIG. 11 is an illustration showing the operation of the structural arrangement shown in FIG. 10.

With the flash device arranged in this manner, when the flash device is mounted on the camera and when the end of the adapter 207 abuts on a raised portion 200d of the casing part 200a of the body 200, the diaphragm aperture of the photo-taking lens, which is not shown, is adjusted as described with reference to FIGS. 1, 5 and 7 and as shown with a full line in FIG. 11. Referring now to FIG. 10(b), the angles of projection of the main flashing and pre-flashing parts gradually narrow as the adapter 207 is moved forward. The guide number of the flash device then increases with the amount of forward movement of the adapter 207. Accordingly, the relation of the apertures of the photo-taking lens to be adjusted to the adequately operable distance range varies as indicated by broken lines in FIG. 11. This relationship changes as indicated by a line L1 when the adapter 207 is moved forward to a slight extent and changes further as indicated by another line L2 when the adapter 207 is moved further forward. With the adapter 207 capable of being moved forward in this manner, flash photography can be carried out with a small aperture for an object at a relatively long distance.

The above Fresnel lenses 203 and 206 are formed by convex lenses. However, they may be formed by concave lenses to permit use of the adapter 207 as a wide adapter. Such a modification, of course, does not affect the relationships between the photo-taking lens and the operable distance range. The relationship still varies with the extent of the forward movement of the adapter. In this case, however, the operable distance using a small aperture becomes a shorter distance instead of a longer distance.

Figure 12:
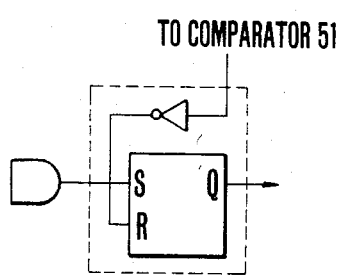
FIG. 12 is a circuit diagram showing the details of a latch circuit included in the embodiments shown in FIGS. 1, 5 and 7.

FIG. 12 shows, by way of example, the details of each of the latch circuits shown in FIGS. 1, 5 and 7. Referring to FIG. 12, the part encompassed with a broken line represents the latch circuit 85, 86 or 87. Such being the arrangement, the latch circuit 85, 86 or 87 is released from a reset state in response to an HL output from the comparator 51. When an HL output is produced from the AND gate (82-84, 150 shown in FIGS. 1, 5 and 7) connected to the set terminals, the latch circuit 85, 86 or 87 produces an HL output from the output perminal Q thereof. This condition of the latch circuit 85, 86 or 87 persists until the output of the comparator 51 becomes LL to supply an HL signal to the reset terminal R of the latch circuit 85, 86 or 87 through an inverter.

Figure 13:
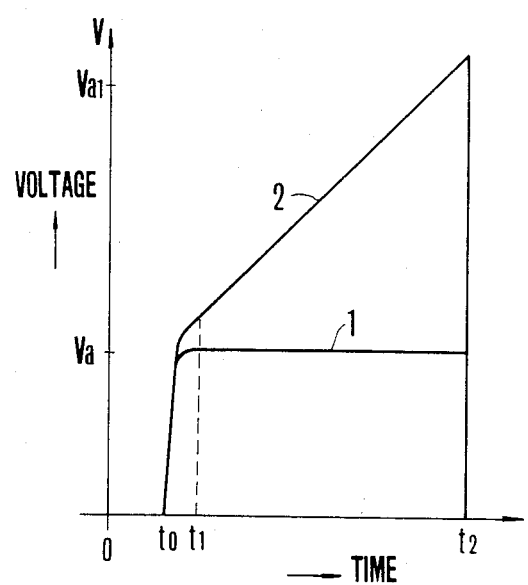
FIG. 13 is an illustration showing the operation of the flash devices shown in FIGS. 1, 5 and 7.

In each of the embodiments described above, the pulse time of the one-shot circuit 131 is set at 10 $\mu$s, which corresponds to the pre-flashing time. However, in accordance with the invention, this length of time may be increased to permit determination of an aperture value by taking into consideration the natural brightness of the object to be photographed. More specifically stated with reference to FIG. 13, the pulse width time of the one-shot circuit 131 is set at t0–t2. Then after the lapse of the pre-flashing time t0–t1, the capacitor 57 shown in FIGS. 1, 5 and 7 shows a charge characteristic corresponding to the brightness of the object. Assuming that the object is located at a distance within the medium distance range d1–d2, when the capacitor is charged to a voltage value Va through the pre-flashing action, the charge level of the capacitor 57 is kept at Va as represented by a line 1 and the aperture value is set at $F_1$ if the object is dark. However, if the object is extremely bright at that time, the capacitor 57 is charged in a manner indicated by a line 2, after the pre-flashing action. Accordingly, the charge level of the capacitor 57 at the time of the latch circuit 85, 86 or 87 operation reaches a value Va1 and the aperture value is set at $F_0$. With the pulse width time lengthened in this manner, the aperture value can be determined taking natural brightness into consideration. This arrangement, therefore, provides an advantage for a backlight shot.

In the flash device according to the invention, when the distance to the object to be photographed is detected by pre-flashing or the like to be beyond an adequately operable distance range or to be too close, either the flashing action is inhibited or the photography mode is shifted to a daylight photography mode. Therefore, in accordance with the invention, the inconvenience that arises when an object to be photographed is beyond an adequately operable distance range can be effectively prevented. The adjustment of the charging level for the main capacitor according to the distance to the object effectively shortens the waiting time for flash photography of an object located a short distance away. This arrangement gives more shutter chances to the photographer.

What we claim:

1. A flash device, comprising:
   (a) a distance detection circuit for detecting a distance to an object to be photographed;
   (b) an aperture determining circuit arranged to determine an aperture value for flash photographing according to the distance detected by said distance detection circuit;
   (c) an output signal forming circuit arranged to produce an output when the distance detected by said distance detection circuit is farther than a predetermined distance; and
   (d) a flashing circuit including a flash discharge tube and arranged to cause said flash discharge tube to flash at the time of flash photographing, said circuit being arranged to become inoperative in response to the output of said output signal forming circuit.

2. A flash device, comprising:
   (a) a distance detection circuit for detecting a distance to an object to be photographed;
   (b) an aperture determining circuit arranged to determine an aperture value for flash photographing according to the distance detected by said distance detection circuit;

(c) an output signal forming circuit arranged to produce an output when the distance detected by said distance detection circuit is nearer than a predetermined distance; and (d) a flashing circuit including a flash discharge tube and arranged to cause said flash discharge tube to flash at the time of flash photographing, said circuit being arranged to become inoperative in response to the output of said output signal forming circuit.

3. A flash device, comprising:

(a) a distance detection circuit for detecting a distance to an object to be photographed;

(b) an aperture determining circuit arranged to determine an aperture value for flash photographing according to the distance detected by said distance detection circuit;

(c) an output signal forming circuit arranged to produce an output when the aperture value determined by said aperture determining circuit is smaller than the full-open aperture value of the camera; and (d) a flashing circuit including a flash discharge tube and arranged to cause said flash discharge tube to flash at the time of flash photographing, said circuit being arranged to become inoperative in response to the output of said output signal forming circuit.

4. A flash device according to claim 1, wherein there is provided detection means for detecting the full-open aperture value of the camera; said output signal forming circuit is arranged to determine said predetermined distance value in accordance with the full-open aperture value detected by said detection means; and whereby said signal forming circuit is arranged to produce an output when the distance to the object is farther than the distance determined according to the full-open aperture value.

5. A flash device, comprising:

(a) a main capacitor;

(b) a distance detection circuit for detecting a distance to an object to be photographed;

(c) a level detection circuit for detecting the charge level of said main capacitor, said level detection circuit having a first mode in which the circuit produces a signal when the detected level reaches a first predetermined level and a second mode in which the circuit produces a signal when the detected level reaches a second level which is higher than the first level, said level detection circuit being arranged to operate in the second mode when the distance value detected by said distance detection circuit is farther than a predetermined distance value; and (d) a flashing circuit including a flash discharge tube, said flashing circuit being arranged to cause said flash discharge tube to flash at the time of flash photographing and being arranged to become operative in response to the signal from said level detection circuit.

6. A flash device, comprising:

(a) a pre-flashing circuit arranged to perform a pre-flashing action;

(b) a reflection light quantity detection circuit including a light sensitive element which receives a reflection light resulting from said pre-flashing action and coming from an object to be photographed, said reflection light quantity detection circuit being arranged to detect the quantity of said reflection light resulting from the pre-flashing action and to produce an output corresponding to the detected quantity of the reflection light;

(c) an aperture signal forming circuit including a plurality of aperture signal sources for forming signals corresponding to different aperture values;

(d) a selection circuit arranged to select an applicable aperture signal source out of the aperture signal sources of said aperture signal forming circuit according to the output of said detection circuit;

(e) an output signal forming circuit arranged to detect the output of said reflection light quantity detection circuit and to produce an output signal when said output is in a state indicative of that the reflection light quantity is lower than a predetermined level of light quantity; and (f) a flashing circuit including a flash discharge tube and a trigger circuit for triggering said flash discharge tube, said flashing circuit being arranged to become inoperative in response to the output signal from said signal forming circuit.

7. A flash device, comprising:

(a) a pre-flashing circuit arranged to perform a pre-flashing action;

(b) a reflection light quantity detection circuit including a light sensitive element which receives a reflection light resulting from said pre-flashing action and coming from an object to be photographed, said reflection light quantity detection circuit being arranged to detect the quantity of said reflection light resulting from the pre-flashing action and to produce an output corresponding to the detected quantity of the reflection light;

(c) an aperture signal forming circuit including a plurality of aperture signal sources for forming signals corresponding to different aperture values;

(d) a selection circuit arranged to select an applicable aperture signal source out of the aperture signal sources of said aperture signal forming circuit according to the output of said detection circuit;

(e) a signal forming circuit arranged to detect the output of said reflection light quantity detection circuit and to produce an output signal when said output is in a state indicative of that the reflection light quantity is higher than a predetermined level of light quantity; and (f) a flashing circuit including a flash discharge tube and a trigger circuit for triggering said flash discharge tube, said flashing circuit being arranged to become inoperative in response to the output signal from said signal forming circuit.

8. flash device, comprising:

(a) a pre-flashing circuit arranged to perform a pre-flashing action;

(b) a reflection light quantity detection circuit including a light sensitive element which receives a reflection light resulting from said pre-flashing action and coming from an object to be photographed, said reflection light quantity detection circuit being arranged to detect the quantity of said reflection light resulting from the pre-flashing action and to produce an output corresponding to the detected quantity of the reflection light;

(c) an aperture signal forming circuit including a plurality of aperture signal sources for forming signals corresponding to different aperture values;

(d) a selection circuit arranged to select an applicable aperture signal source out of the aperture signal sources of said aperture signal forming circuit according to the output of said detection circuit;

(e) an aperture information detection circuit arranged to detect information on the full-open aperture value of the camera;

(f) a signal forming circuit arranged to detect the output of said reflection light quantity detection circuit and to produce a signal when the state of the detected output comes to be in a predetermined relation to the full-open aperture value detected by said aperture information detection circuit; and (g) a flashing circuit including a flash discharge tube and a trigger circuit for triggering said flash discharge tube, said flashing circuit being arranged to become inoperative in response to the output signal from said signal forming circuit.

9. A flash device according to claim 6, further including: an aperture information detection circuit which detects information on the full-open aperture value of the camera; and an adjusting circuit which adjusts said level of light quantity in accordance with the full-open aperture value information detected by said aperture information detection circuit.

10. A flash device according to claim 1, 2 or 3, wherein said flashing circuit includes a trigger circuit which triggers said flash discharge tube in response to an operation signal representative of an operation of a synchronization switch of the camera; and inhibiting means which, in response to the output of said output signal forming circuit, inhibits said action signal from being transmitted to said trigger circuit.

11. A flash device according to claim 6, 7 or 8, wherein said trigger circuit is arranged to operate in response to an operation signal representative of the operation of a synchronization switch of the camera and is provided with inhibiting means which, in response to the output signal from said output signal forming circuit, inhibits said action signal from being transmitted to said trigger circuit.

12. A flash device, comprising:

(a) a main capacitor;

(b) a charge completion signal forming circuit arranged to detect the charge level of the main capacitor and to produce a charge completion signal when the detected level reaches a first predetermined level;

(c) a pre-flashing circuit which becomes operative in response to said charge completion signal, said circuit being arranged to perform a pre-flashing action;

(d) a reflection light quantity detection circuit including a light sensitive element which receives a reflection light resulting from said pre-flashing action and coming from an object to be photographed, said reflection light quantity detection circuit being arranged to detect the quantity of said reflection light resulting from the pre-flashing action and to produce an output corresponding to the detected quantity of the reflection light;

(e) an aperture signal forming circuit including a plurality of aperture signal sources for forming signals corresponding to different aperture values;

(f) a selection circuit arranged to select an applicable aperture signal source out of the aperture signal sources of said aperture signal forming circuit, according to the output of said detection circuit;

(g) an output signal forming circuit arranged to detect the output of said reflection light quantity detection circuit and to produce an output signal when said output is in a state indicative of that the reflection light quantity is lower than a predetermined level of light quantity;

(h) a level adjustment circuit which becomes operative in response to the output signal from said output signal forming circuit, said level adjustment circuit being arranged to adjust said charge level and to inhibit said charge completion signal from being produced until the charge level of said main capacitor reaches a second predetermined level which is higher than said first level; and (i) a flashing circuit which becomes operative in response to said charge completion signal, said circuit including a flash discharge tube, said circuit being arranged to cause the electric charge of said main capacitor to be discharged to said flash discharge tube in response to an operating signal of a synchronization switch of the camera when said circuit is operative.

13. A flash photographing system, comprising:

(A) a flash device which includes:

(a) a distance detection circuit for detecting a distance to an object to be photographed;

(b) an aperture determining circuit arranged to determine an aperture value for flash photographing according to the distance detected by said distance detection circuit;

(c) an output signal forming circuit arranged to produce an output when the distance detected by said distance detection circuit is farther than a predetermined distance;

(d) a main capacitor which accumulates an electric charge as flash energy;

(e) a charge completion signal forming circuit arranged to detect the charge level of said main capacitor and to produce a charge completion signal when said level reaches a predetermined value, said circuit being arranged to inhibit said charge completion signal from being produced when the output of said output signal forming circuit is received; and (f) flashing means for flashing by discharging the electric charge of said main capacitor;

(B) a camera which includes:

(a) an exposure control circuit having an aperture control circuit, said exposure control circuit having a daylight photographing mode and a flash photographing mode and being arranged to have said aperture control circuit adjust a diaphragm aperture according to an aperture value determined by said aperture determining circuit of the flash device when the exposure control circuit is in the flash photographing mode; and (b) a mode change-over circuit arranged to shift the mode of said exposure control circuit from the daylight photographing mode to the flash photographing mode in response to said charge completion signal.

14. A flash photographing system, comprising:

(A) a flash device which includes:

(a) a distance detection circuit for detecting a distance to an object to be photographed;

(b) an aperture determining circuit arranged to determine an aperture value for flash photographing according to the distance detected by said distance detection circuit;

(c) an output signal forming circuit arranged to produce an output when the distance detected by said distance detection circuit is nearer than a predetermined distance;

(d) a main capacitor which accumulates an electric charge as flash energy;

(e) a charge completion signal forming circuit arranged to detect the charge level of said main capacitor and to produce a charge completion signal when said level reaches a predetermined value, said circuit being arranged to inhibit said charge completion signal from being produced when the output of said output signal forming circuit is received; and (f) flashing means for flashing by discharging the electric charge of said main capacitor;

(B) a camera which includes:

(a) an exposure control circuit having an aperture control circuit, said exposure control circuit having a daylight photographing mode and a flash photographing mode and being arranged to have said aperture control circuit adjust a diaphragm aperture according to an aperture value determined by said aperture determining circuit of the flash device when the exposure control circuit is in the flash photographing mode; and (b) a mode change-over circuit arranged to shift the mode of said exposure control circuit from the daylight photographing mode to the flash photographing mode in response to said charge completion signal.

15. A flash photographing system, comprising:

(A) a flash device which includes:

(a) a distance detection circuit for detecting a distance to an object to be photographed;

(b) an aperture determining circuit arranged to determine an aperture value for flash photographing according to the distance detected by said distance detection circuit;

(c) an output signal forming circuit arranged to produce an output when the aperture value determined by said aperture determining circuit is smaller than the full-open aperture value of the camera;

(d) a main capacitor which accumulates an electric charge as flash energy;

(e) a charge completion signal forming circuit arranged to detect the charge level of said main capacitor and to produce a charge completion signal when said level reaches a predetermined value, said circuit being arranged to inhibit said charge completion signal from being produced when the output of said output signal forming circuit is received; and (f) flashing means for flashing by discharging the electric charge of said main capacitor;

(B) a camera which includes:

(a) an exposure control circuit having an aperture control circuit, said exposure control circuit having a daylight photographing mode and a flash photographing mode and being arranged to have said aperture control circuit adjust, a diaphragm aperture according to an aperture value determined by said aperture determining circuit of the flash device when the exposure control circuit is in flash photographing mode; and (b) a mode change-over circuit arranged to shift the mode of said exposure control circuit from the daylight photographing mode to the flash photographing mode in response to said charge completion signal.

16. A flash photographing system according to claim 1, 2, 3, 5, 13, 14 or 15, wherein said distance detection circuit includes a pre-flashing circuit which is arranged to perform pre-flashing and a reflection light quantity detection circuit which detects the quantity of reflection light of an object to be photographed resulting from said pre-flashing, said distance detection circuit being arranged to detect the distance to the object on the basis of the level of said reflection light quantity.

17. A flash photographing system according to claim 13, wherein said camera further includes a full-open aperture information source which forms a full-open aperture information signal; said flash device further includes detection means which detects the full-open aperture information signal from said information source; and said output signal forming circuit is arranged to determine said predetermined distance value according to the full-open aperture information thus detected.

18. A flash photograhing system comprising:

(A) a flash device, which includes:

(a) a pre-flashing circuit arranged to perform a pre-flashing action;

(b) a reflection light quantity detection circuit including a light sensitive element which receives a reflection light resulting from said pre-flashing action and coming from an object to be photographed, said reflection light quantity detection circuit being arranged to detect the quantity of said reflection light resulting from the pre-flashing action and to produce an output corresponding to the detected quantity of the reflection light;

(c) an aperture signal forming circuit including a plurality of aperture signal sources for forming signals corresponding to different aperture values;

(d) a selection circuit arranged to select an applicable aperture signal source out of the aperture signal sources of said aperture signal forming circuit according to the output of said detection circuit;

(e) an output signal forming circuit arranged to detect the output of said reflection light quantity detection circuit and to produce an output signal when said output is in a state indicative of that the reflection light quantity is lower than a predetermined level of ligh quantity;

(f) a main capacitor to be charged with an electric charge required for flashing;

(g) a charge completion signal forming circuit arranged to detect the level of the electric charge of said main capacitor and to produce a charge completion signal when the charge level reaches a predetermined value, said circuit being arranged to inhibit, in response to the output signal of said output signal forming circuit, said charge completion signal from being produced; and (B) a camera which includes:

(a) an exposure control circuit provided with an aperture control circuit, said exposure control circuit being arranged to operate either in a daylight photographing mode or in a flash photographing mode and to have said aperture control circuit adjust a diaphragm aperture according to the signal from said aperture signal forming circuit when the exposure control circuit is in the flash photographing mode; and (b) a mode change-over circuit arranged to shift the mode of said exposure control circuit from the daylight photographing mode to the flash photographing mode in response to said charge completion signal.

19. A flash photographing system, comprising:
(A) A flash device which includes:
   (a) a pre-flashing circuit arranged to perform a pre-flashing action;
   (b) a reflection light quantity detection circuit including a light sensitive element which receives a reflection light resulting from said pre-flashing action and coming from an object to be photographed, said reflection light quantity detection circuit being arranged to detect the quantity of said reflection light resulting from the pre-flashing action and to produce an output corresponding to the detected quantity of the reflection light;
   (c) an aperture signal forming circuit including a plurality of aperture signal sources for forming signals corresponding to different aperture values;
   (d) a selection circuit arranged to select an applicable aperture signal source out of the aperture signal sources of said aperture signal forming circuit according to the output of said detection circuit;
   (e) a signal forming circuit arranged to detect the output of said reflection light quantity detection circuit and to produce an output signal when said output is in a state indicative of that the reflection light quantity is higher than a predetermined level of light quantity;
   (f) a main capacitor to be charged with an electric charge required for flashing;
   (g) a charge completion signal forming circuit arranged to detect the level of the electric charge of said main capacitor and to produce a charge completion signal when the charge level reaches a predetermined value, said circuit being arranged to inhibit, in response to the output signal of said output signal forming circuit, said charge completion signal from being produced; and
(B) a camera which includes:
   (a) an exposure control circuit provided with an aperture control circuit, said exposure control circuit being arranged to operate either in a daylight photographing mode or in a flash photographing mode and to have said aperture control circuit adjust a diaphragm aperture according to, the signal from said aperture signal forming circuit when the exposure control circuit is in the flash photographing mode; and
   (b) a mode change-over circuit arranged to shift the mode of said exposure control circuit from the daylight photographing mode to the flash photographing mode in response to said charge completion signal.

20. A flash photographing system, comprising:
(A) A flash device which includes:
   (a) a pre-flashing circuit arranged to perform a pre-flashing action;
   (b) a reflection light quantity detection circuit including a light sensitive element which receives a reflection light resulting from said pre-flashing action and coming from an object to be photographed, said reflection light quantity detection circuit being arranged to detect the quantity of said reflection light resulting from the pre-flashing action and to produce an output corresponding to the detected quantity of the reflection light;
   (c) an aperture signal forming circuit including a plurality of aperture signal sources for forming signals corresponding to different aperture values;
   (d) a selection circuit arranged to select an applicable aperture signal source out of the aperture signal sources of said aperture signal forming circuit according to the output of said detection circuit;
   (e) an aperture information detection circuit arranged to detect information on the full-open aperture value of the camera;
   (f) a signal forming circuit arranged to detect the output of said reflection light quantity detection circuit and to produce a signal when the state of the detected output comes to be in a predetermined relation to the full-open aperture value detected by said aperture information detection circuit;
   (g) a main capacitor to be charged with an electric charge required for flashing;
   (h) a charge completion signal forming circuit arranged to detect the level of the electric charge of said main capacitor and to produce a charge completion signal when the charge level reaches a predetermined value, said circuit being arranged to inhibit, in response to the output signal of said output signal forming circuit, said charge completion signal from being produced; and
(B) a camera which includes:
   (a) an exposure control circuit provided with an aperture control circuit, said exposure control circuit being arranged to operate either in a daylight photographing mode or in a flash photographing mode and to have said aperture control circuit adjust a diaphragm aperture according to the signal from said aperture signal forming circuit when the exposure control circuit is in the flash photographing mode; and
   (b) a mode change-over circuit arranged to shift the mode of said exposure control circuit from the daylight photographing mode to the flash photographing mode in response to said charge completion signal.

21. A flash device usable in combination with a camera which is arranged to shift from a daylight photographing mode to a flash photographing mode in response to a charge completion signal and, in the flash photographing mode, to adjust a diaphragm aperture according to an aperture signal from the flash device, said flash device comprising:
   (a) a pre-flashing circuit arranged to perform pre-flashing;
   (b) a light measurement circuit which measures a reflection light resulting from said pre-flashing and coming from an object to be photographed, said light measurement circuit being arranged to produce an output corresponding to the level of quantity of said reflection light;
   (c) a signal producing circuit arranged to produce a signal when the output of the light measurement circuit is in a state which is lower than a predetermined reflection light quantity level;

(d) an aperture signal forming circuit arranged to form an aperture signal on the basis of the output of said light measurement circuit, said camera being arranged to adjust a diaphragm aperture according to said aperture signal when the camera is in said flash photographing mode;

(e) flashing means;

(f) a main capacitor arranged to accumulate an electric charge required for flashing by said flashing means; and (g) a charge completion signal forming circuit which detects the electric charge level of said main capacitor and forms a charge completion signal when said electric charge level reaches a predetermined value of level, said circuit being arranged to be inhibited from producing said charge completion signal by the signal produced from said signal producing circuit.

22. A flash device usable in combination with a camera which is arranged to shift from a daylight photographing mode to a flash photographing mode in response to a charge completion signal and, when in said flash photographing mode, to adjust a diaphragm aperture according to an aperture signal from the flash device, said flash device comprising:

(a) a pre-flashing circuit arranged to perform pre-flashing;

(b) a light measurement circuit which measures a reflection light resulting from said pre-flashing and coming from an object to be photographed, said light measurement circuit being arranged to produce an output corresponding to the level of quantity of said reflection light;

(c) a signal producing circuit arranged to produce a signal when the output of the light measurement circuit is in a state which is higher than a predetermined reflection light quantity level;

(d) an aperture signal forming circuit arranged to form an aperture signal on the basis of the output of said light measurement circuit, said camera being arranged to adjust a diaphragm aperture according to said aperture signal when the camera is in said flash photographing mode;

(e) flashing means;

(f) a main capacitor arranged to accumulate an electric charge required for flashing by said flashing means; and (g) a charge completion signal forming circuit which detects the electric charge level of said main capacitor and forms a charge completion signal when said electric charge level reaches a predetermined value of level, said circuit being arranged to be inhibited from producing said charge completion signal by the signal produced from said signal producing circuit.

* * * * *